May 27, 1969
A. KOHLENBERG
3,447,132
APPARATUS AND METHOD FOR PROCESSING DIGITAL
DATA AFFECTED BY ERRORS
Filed May 14, 1965
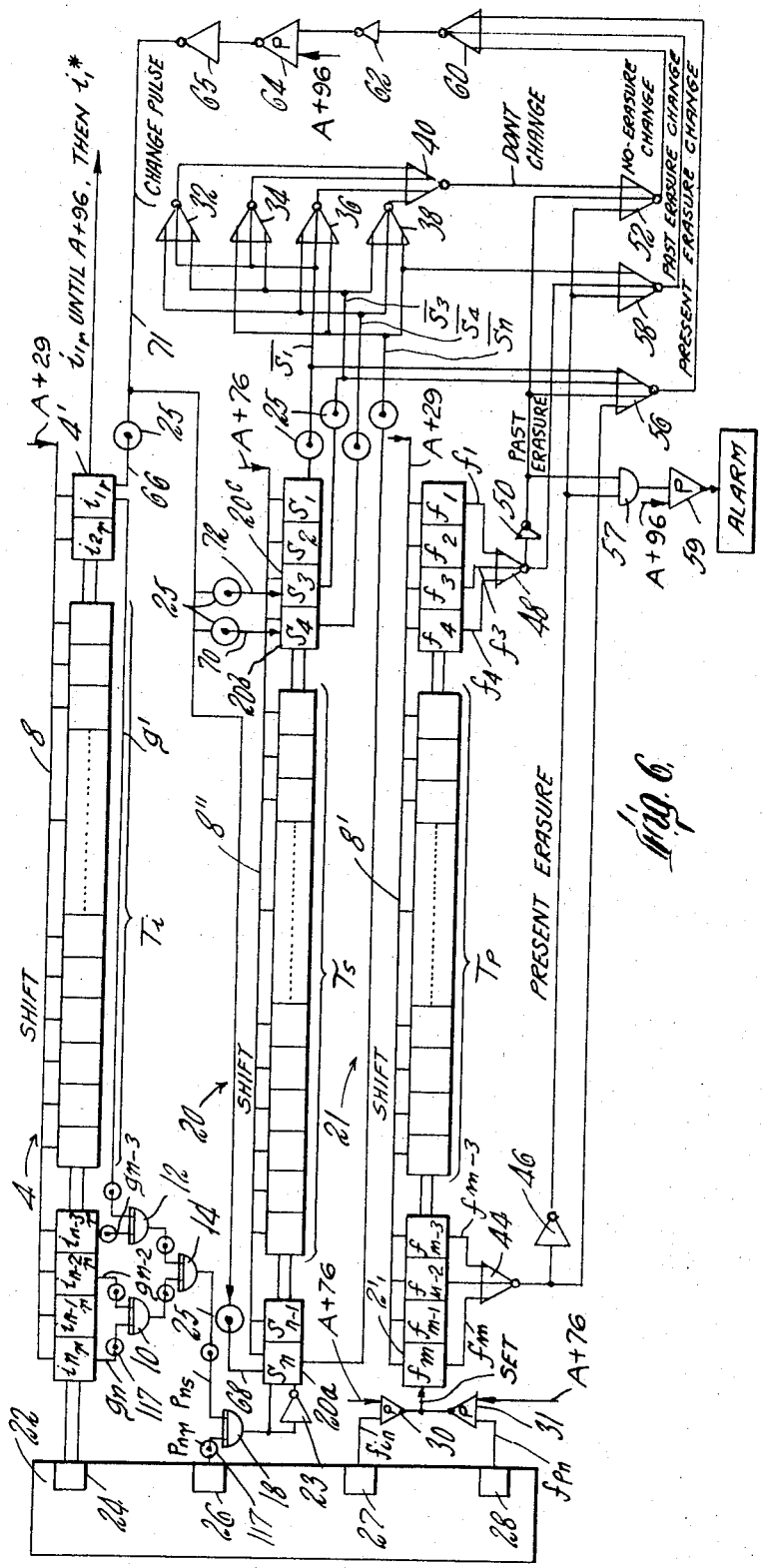
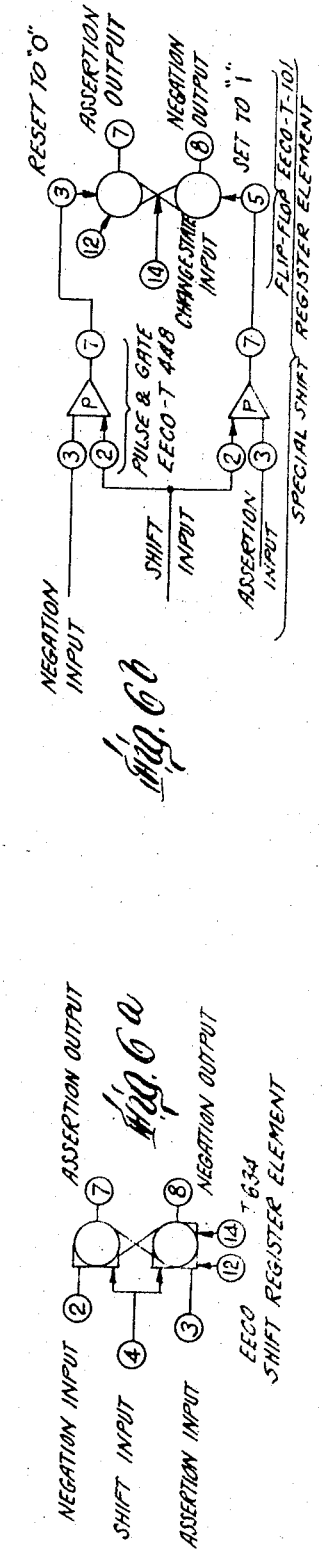

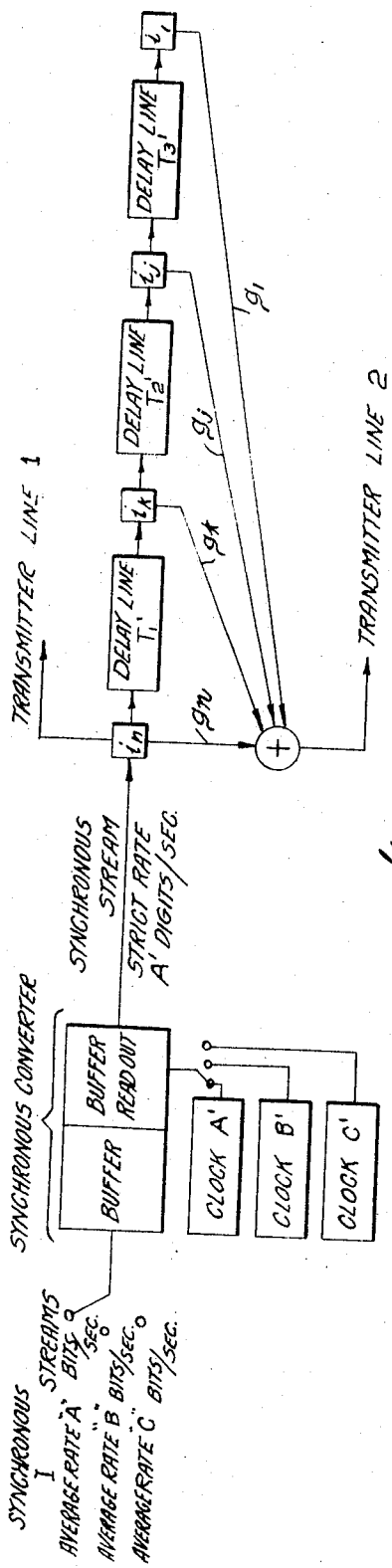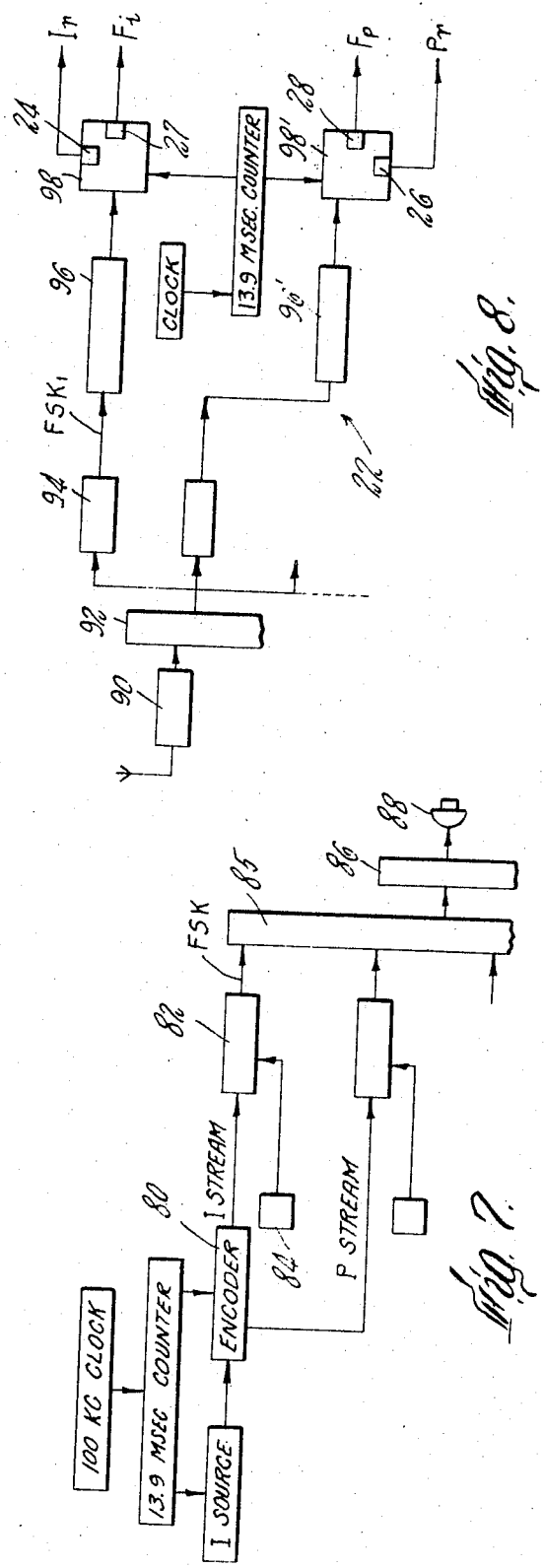

13.9 MILLISECONDS

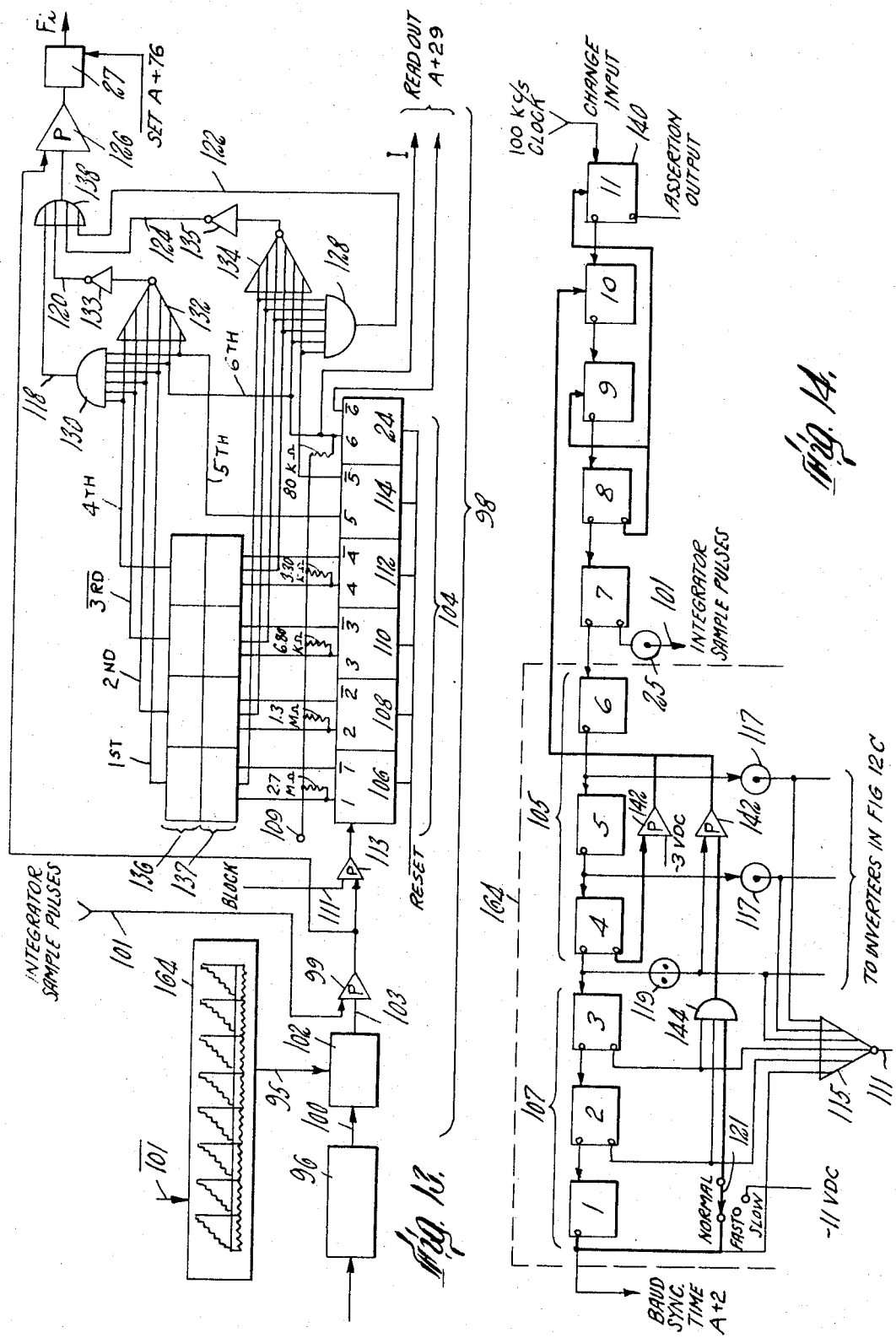

United States Patent Office 3,447,132
Patented May 27, 1969

3,447,132
APPARATUS AND METHOD FOR PROCESSING DIGITAL DATA AFFECTED BY ERRORS
Arthur Kohlenberg, Cambridge, Mass., assignor to Codex Corporation, Watertown, Mass., a corporation of Delaware
Continuation-in-part of application Ser. No. 383,387, July 17, 1964. This application May 14, 1965, Ser. No. 455,787
Int. Cl. G08b 29/00; G06f 11/00
U.S. Cl. 340—146.1                                    32 Claims

ABSTRACT OF THE DISCLOSURE

Error burst correction in digital transmission using convolutional codes. A set of three or more redundancy signals are formed to check each information signal. Some but not all of the transmitted signals are spaced a maximum burst length apart, the others being closer together. The decoding logic, by use of guard means for the burst when it enters the decoder, decodes an information bit even when more than one of the uncorrected bits in the set to which it is responsive is in error. The guard means is shown in the form of additional lengths of delay, providing a diffuse code, and in the form of a monitor which records the probable location of a burst and suppresses the bursty data from affecting the decoding decision.

---

This application is a continuation-in-part of my copending application Ser. No. 383,387 filed July 17, 1964, and now abandoned, entitled, "Apparatus and Methods for Processing Binary Data Affected by Errors."

This invention relates to error correcting coding systems for digital communications, and in particular to systems employing convolutional codes.

A principal object of the invention is to increase the capacity and accuracy of conventional communications channels such as telephone, tropospheric scatter radio, and ionospheric reflected high frequency radio.

Another object of the invention is to provide a coding system of the Massey threshold type which is capable of correcting extended bursts of errors.

Another principal object is to provide coding systems which are simple and inexpensive to implement.

According to the invention it is found that the taps of a convolutional code system can be spaced in accordance with the characteristics of the channel with which the system is to be used, to obtain an increase in error correcting power. Here "channel" is used to refer to the entire transmission system between the encoder and decoder.

Advantageously the tap spacing can be defined according to two somewhat different principles, referred to here as the "diffuse" and the "modular" principles.

According to the diffuse principle the tap spacing should be greater than the maximum probable length of the error bursts of the channel. This is based on the fact that, with a reasonable degree of accuracy, error bursts will not exceed a particular length, through their actual lengths vary considerably.

According to the modular principle, every tap spacing in the system should be an integral multiple of the error repeat length of the channel. This is based upon the fact, for certain channels, that there is a greater probability for errors to occur at a given interval (the "error repeat length") than there is at random. By constructing the code using that interval as the module, good digits lying between such probabilistically related errors can be decoded without using digits affected by those errors, and vice versa.

It is found that the modular principle offers particularly beneficial results when employed in coding systems for high frequency radio. Here the error repeat length is determined by the number of tones into which the digital stream is broken for transmission. Certain fades encountered with such transmissions are frequency selective, affecting one or a few tones at a time. This creates the probability of periodic errors in the final stream at the receiver.

In the case of high frequency radio a large increase in error correcting power is achieved by use of both principles in combination for defining the spacing of the taps. This results from the fact that fades in the high frequency radio channel tend to move across the frequency spectrum, affecting one tone (or perhaps a few) and then sweeping past, to affect other tones. With prior art non-modular systems, so long as the fade was affecting any part of the transmission, there would be a high error condition, hence bursts would be quite long, with correspondingly short guard space in between. In contrast, since a single tone is not affected for nearly as long as the entire transmission, it is found that the error bursts in the modular code system are of shorter length, and the error-free guard space in between bursts is considerably longer.

Despite the above, when viewed broadly, the combination of the diffuse and modular principles of the invention is not limited to high frequency radio, and on the other hand there are important instances in which the tap spacing may be defined by either the diffuse or the modular principle alone.

In the following the concept of spacing the taps in accordance with the channel characteristics first will be illustrated with the diffuse principle, and then it will be explained how the modular principle can be combined with it.

The present invention offers advantages in various convolutional decoding systems. It is however, of particular advantage when applied to the Massey threshold system, to achieve an efficient random error correcting capability as well as the ability to correct error bursts, and for this reason the illustrations of the invention herein primarily refer to the Massey system.

Briefly, the Massey threshold decoder operates by forming a set of subsolution signals for each information bit being decoded, and examining this set to determine the decoded value of the information bit.

For this purpose, as with other convolutional systems, the Massey decoder receives redundancy and information bits from the encoder, the redundancy bits having been produced by the encoder by modulo 2 addition of information bits appearing at certain tapped positions along a memory chain through which the information bit stream is passed before transmission. As is well known, the location of these tapped positions is described by what is called a "coding rule."

The redundancy bits are transmitted to the decoder as a separate stream, or can be multiplexed with the information stream.

At the decoder the same information bits, but now possibly affected by errors, are compared to the corresponding redundancy bits, which may also be affected by error, all in accordance with conventional parity check theory. Preferably the comparison is accomplished by adding modulo 2 each received redundancy bit and the corresponding received information bits so that the information components add out and the resulting parity check signal, if a "1," will indicate the presence of error.

According to the Massey system, certain of these parity check signals and modulo 2 sums thereof are selected to form usually a minimum of four subsolution signals, or more for greater error correction capability. This set of subsolution signals is specially selected so as to be orthogonal upon the particular information bit being decoded, that is to say, the information bit being decoded will appear in every subsolution signal in the set while every other information and redundancy bit being employed will appear in only one of the subsolution signals. This set of subsolution signals, either directly or weighted, preferably is in effect summed by ordinary arithmetic, and the resultant sum is compared to a threshold value, thus producing a decoding solution, although examination for certain error combinations is also possible.

For detailed illustration of the Massey system issued Feb. 7, 1967, reference is made to U.S. patent applications Ser. No. 212,312 which has matured into Patent No. 3,303,333, and Ser. No. 299,534.

Heretofore, in employing the Massey system, it has been assumed that the constraint length of the code, determined by the distance between the first and last memory positions, should be as short as possible while preserving the orthogonal relation.

According to the present invention, however, the constraint length is intentionally made greatly longer in a special way, and, advantageously, matched to the characteristics of the particular communication channel being employed, whereby, while preserving the random error correcting ability, the system also becomes capable of correcting error bursts of extended length.

The present invention takes advantage of the fact that in certain communications channels the error bursts can be found to fall into a certain probability pattern, i.e., the error bursts have a characteristic maximum probable length and are in most instances spaced apart considerably further than that length.

As an example, in the troposcatter systems, the maximum probable duration of error bursts is on the order of 1 second, depending somewhat upon the particular path selected, the average length may be on the order of 1/10 second, and such error bursts occur spaced apart by several seconds. The number of bits which the time of 1 second represents is equal to the product of duration and transmission rate, hence for a typical transmission rate of 2,400 bits per second, the maximum probable length of the error bursts for this channel will be 2,400 bits.

According to the present invention, this characteristic maximum probable length is employed in defining the coding rule, i.e., in defining the spacing of the tapped memory positions from which the redundancy bits are formed. Specifically, at least two adjacent tapped positions in the memory are separated by an extended section of storage means having a length greater than the characteristic maximum probable length of the error bursts for the channel, in the case of the example, a length greater than 2,400 digits. Furthermore, a guard means is provided to guard the decoding solution against the effect of an error burst when it is in the decoder but not fully within the special extended section. This system, having at least one of these extended sections of storage means in the information memory, is referred to as a "diffuse code system" due to the diffused character of the codes which are produced.

It should be understood that the maximum probable length of the error bursts varies from channel to channel, but is a value that can commonly be ascertained. The particular value for a channel is influenced by the type of transmission path or storage to which the stream of bits is subjected, and by the type of transmitting and receiving equipment employed. Examples of such influences are attenuation of ionospheric path, interference due to the momentary existence of multiple paths of different lengths, doppler shift, high noise background from other emitters, electric arc, or cosmic rays, cross-talk in the case of telephone circuits, momentary over-compensation by automatic gain control equipment at the receiver, and of course the transmission rate.

Despite these variations in the maximum probable lengths of error burst, there is a characteristic that applies generally to practical systems according to the invention, that the length of the special extended section of memory separating the two adjacent tapped memory positions should be greater than the total number of the tapped positions. Indeed, in the case of the Massey system, the length of the extended section should be greater than the entire constraint length of a minimum length Massey code having the same random error correction capability as the diffuse code. For instance, in Massey codes of coding rate ½ having the ability to correct all combinations of two random errors within the constraint length, the minimum constraint length is only 12, while, according to the invention, the length of the extended storage section should be on the order of 2,400 for a long troposcatter radio channel at a transmission rate of 2,400 bits per second, on the order of 150 for high accuracy digital telephone communications, or on the order of 50 for low transmission rate high frequency radio Teletype, these being channels in which the capability of correcting two random errors is suited.

For extensive illustration of minimum constraint lengths for Massey codes having other error correcting capabilities, and other code rates, the reader is referred to the aforementioned Massey patent applications.

As mentioned above, in addition to the special extended section of storage means in the encoder and decoder information stream memories, a guard means is essential in the diffuse code decoder. This guard means can be of various forms, but two general types are preferred.

The first type, which is referred to herein as the multiple delay type, comprises further extended sections of storage means, each section exceeding the maximum probable length of the error burst, these sections separating other adjacent pairs of tapped memory positions, thus making the code even more diffuse. When the guard means for the system consist only of such additional storage sections, at least a majority of the tapped memory positions should be spaced from one another a distance greater than the maximum possible length which will ensure that at least half of each set of subsolution signals will be unaffected by an error burst that has entered the decoder. As an illustration of the advantages of this arrangement, when employed with the Massey threshold system, the Massey threshold decision means can fill-in the erased digits while using the same logic employed for random error correction, though with some, or in some events total, loss of random error correction capability during the duration of the error burst in the decoder.

Preferably, however, each pair of adjacent tapped memory positions is spaced apart by an extended section of storage means, and preferably such sections are of unequal length. Furthermore, the specific lengths of the storage means are preferably so selected, that, excepting the information bit being decoded, every received bit appearing in a given set of subsolution signals is spaced in its stream from every other bit appearing in the other subsolution signals in the set a distance at least equal to the maximum probable length. Thereby, any one error burst can affect at most half the subsolution signals in the set, and will usually affect less, thus enabling a substantial part of the random error correcting power to be preserved even in the presence of an error burst in the decoder.

The second type of guard means for the diffuse code system is of the error probability tracking type in which the quality of the bits received at the decoder, preferably of both the information and redundancy bits, is monitored. While the invention is applicable to any other tracking means that may be devised, as an example an erasure signal can be generated for each received bit which departs a predetermined amount from a standard so as to be considered erased, and theese erasure signals can be stored. Furthermore, a control means responsive to the erasure signals or other tracked data is provided for controlling the logic of the threshold decisions means, causing only one or more subsolution signals not containing an erasure to determine the decoding solution. Preferably, in the case of erasure signals, the control means suppresses all subsolution signals containing the received signals within the distance of the maximum probable length of the erased signal, which can provide an added margin of safety.

With the erasure type of tracking means, most preferably, for coding rate ½, from the point of view of simplicity, only one extended section of storage means is employed, and the suppression means is adapted to suppress all subsolution signals containing received signals on the side of said section to which the erasure signal relates.

It will be appreciated that the multiple delay type and the tracking type of guard means are not mutually exclusive, but can be combined in various arrangements, depending on the type of channel and other design considerations.

The modular feature is advantageous in combination with the diffuse code feature with either type of guard means. In either case the interval between every pair of adjacent taps in the code system should be a multiple of the characteristic error repeat length of the channel. For example, let it be assumed that the information, stream is to be divided into eight separate streams and applied to an eight tone high frequency modem. An information bit and a parity bit checking the information bit are to be applied to each tone, with every eighth information bit occurring on the same tone. Accordingly a coding system for this channel should be constructed on the module of eight.

Let it be assumed that the maximum probable error burst length is 50 information bits in the recombined stream. Assume also that the guard means for the diffuse system is of the tracking type and that there are to be four tap positions for the coding system. Accordingly, to achieve a diffuse code with modular characteristics, the first tap could be at bit position 1 in the information register, the second tap at position 57 (56 positions away) and the third and fourth taps at positions 65 and 81, so that the tap spacings are the integral multiples 7, 1, and 2 times the module of eight.

In a similar manner the modular principle is applied to the multiple delay type of diffuse codes.

In the drawings:

FIG. 5 is a block diagram of another encoder according to the invention, and capable of handling various transmission bit rates without changing the memory taps;

FIG. 6 is a block diagram of another decoder according to the invention, similar to FIG. 2;

Figure 1:
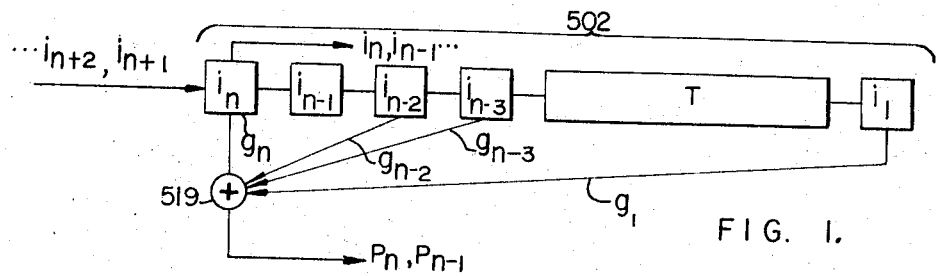
FIG. 1 is a block diagram of an encoder according to the invention, having an extended delay between a pair of memory taps.
Figure 3:
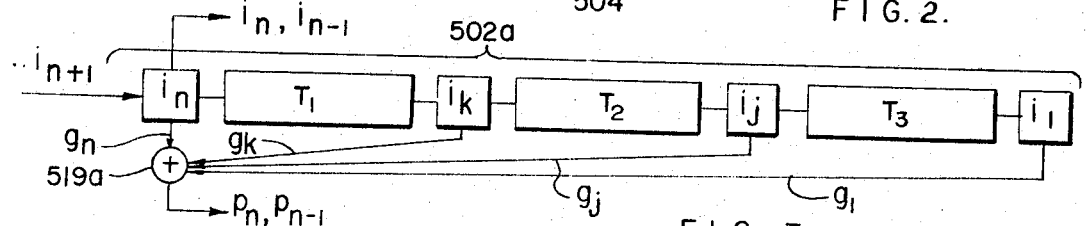
FIG. 3 is a block diagram of another encoder according to the invention, having multiple extended delays, in this particular embodiment each pair of adjacent memory taps being separated by one of the delays.
Figure 9:
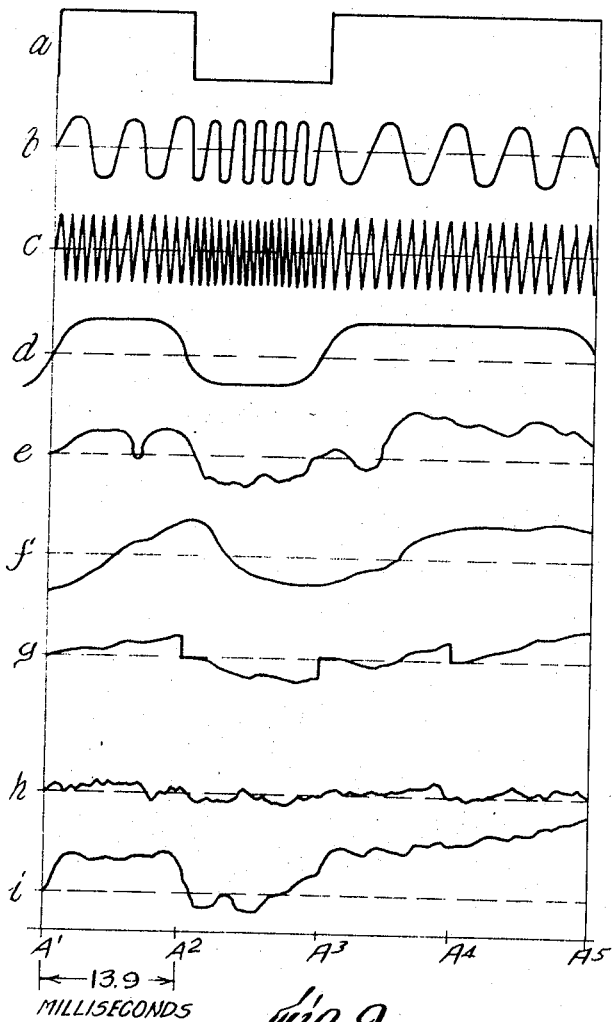
Figure 10B:
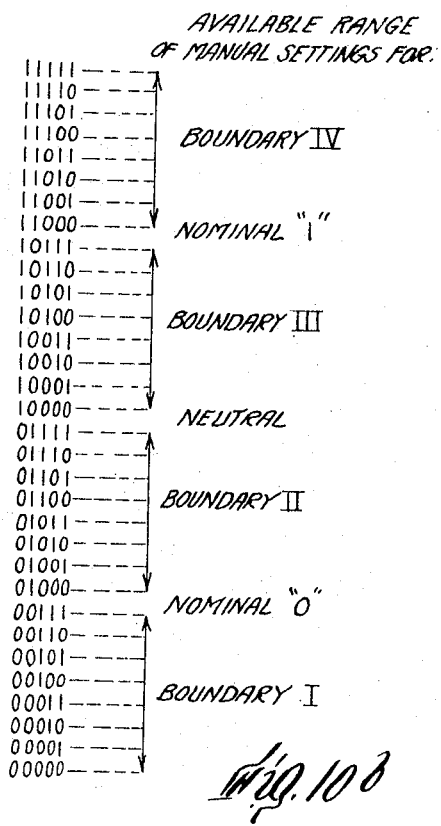
Figure 10A:
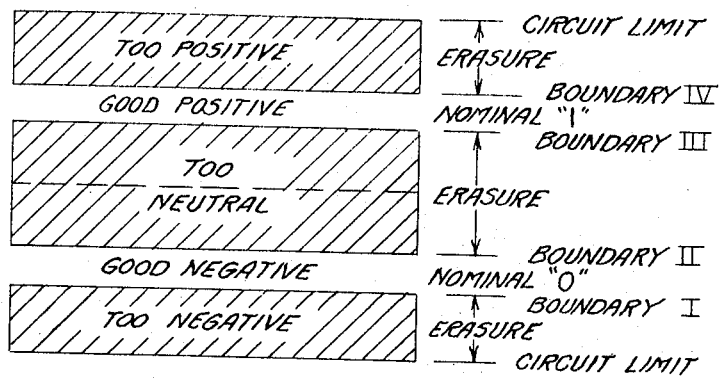

FIGS. 6a and b are schematic diagrams of circuit elements such as can be employed in the decoder of FIG. 6;

FIG. 7 is a block diagram of a typical transmitter station which can include an encoder of either of the types shown in FIG. 1 or 3;

FIG. 8 is a block diagram of a receiver adapted to receive the transmission from the transmitter of FIG. 7, and present the I and P streams to the decoder, and also erasure signal streams $F^i$ and $F^p$;

FIG. 9, including separate graphs $a$ through $i$, represents the states of a transmission as it proceeds through various stages from the transmitter through the receiver;

FIG. 10a is a diagram illustrating, for a typical integrator, the ranges which can be ascribed to the true negative and positive signals ("good" negative and positive) and the ranges which can be ascribed to erasures, the particular values depending upon the types of channel and equipment involved.

Figure 2:
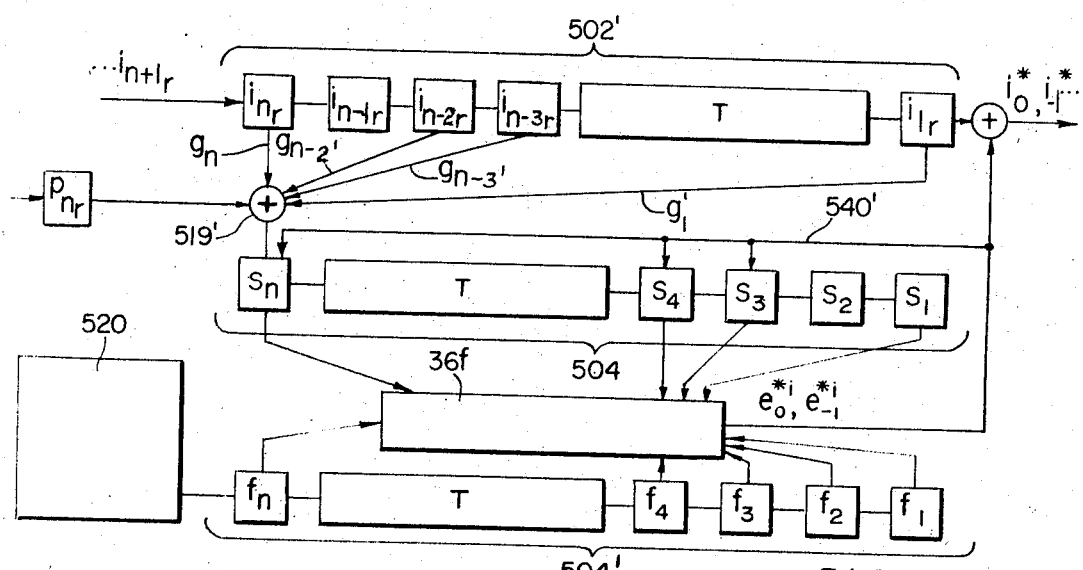
FIG. 2 is a block diagram of a decoder according to the invention, for use with the encoder of FIG. 1, having a tracking type of guard means.
Figure 4:
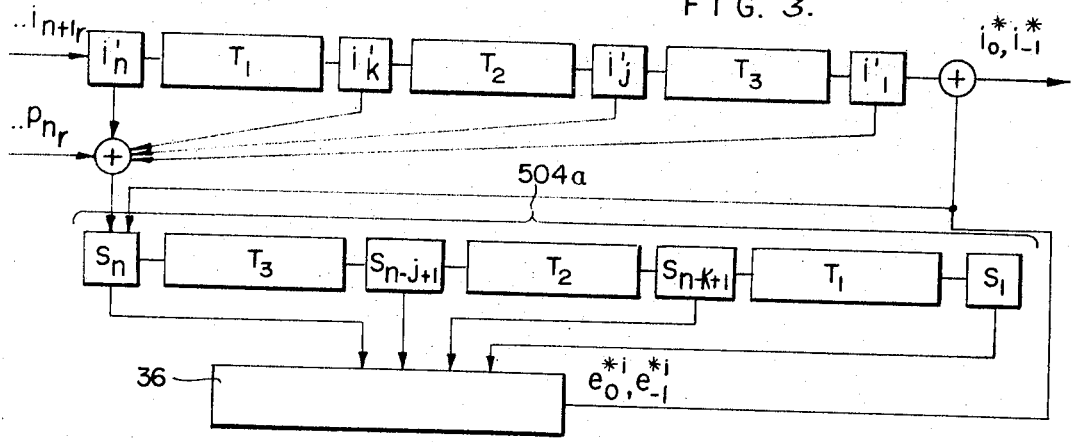
FIG. 4 is a block diagram of a decoder according to the invention, for use with the encoder of FIG. 3, having a multiple delay type of guard means.
Figure 11:
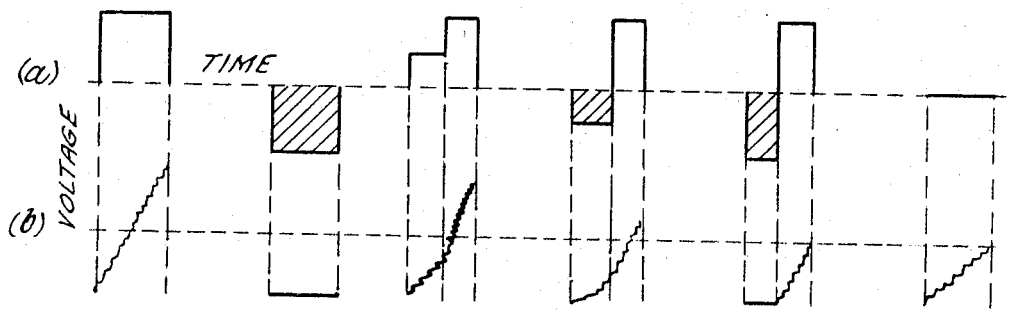
Figure 12A:
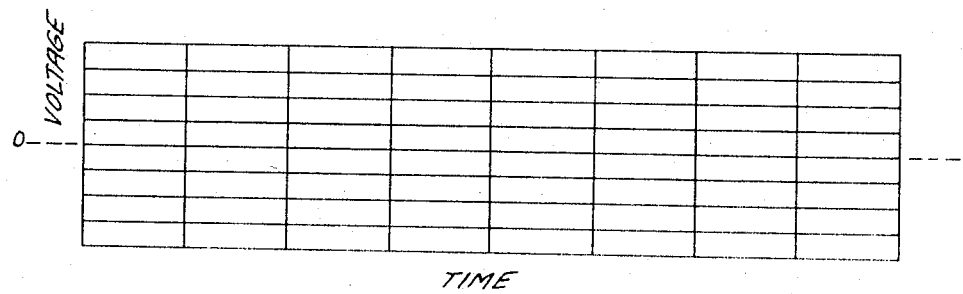
Figure 12B:
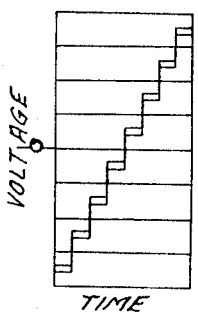
Figure 12C:
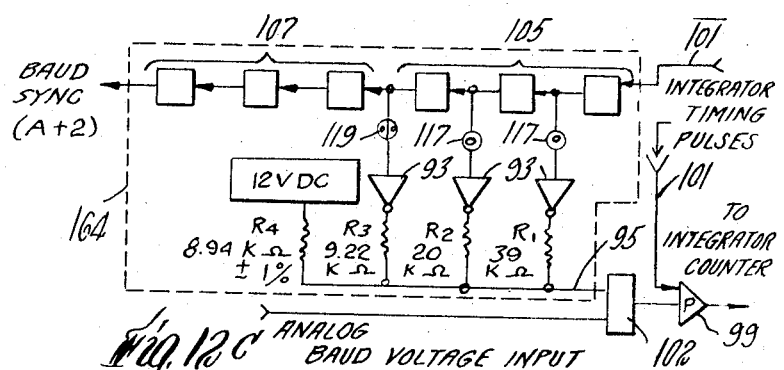
Figure 12D:
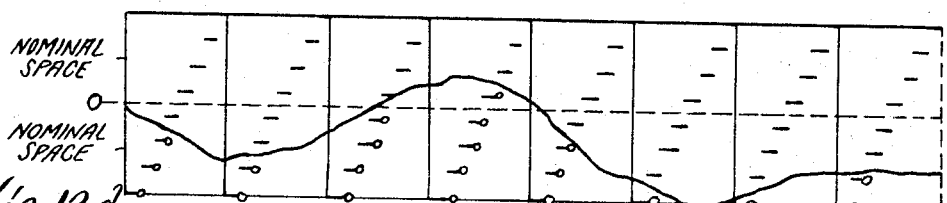
Figure 15:
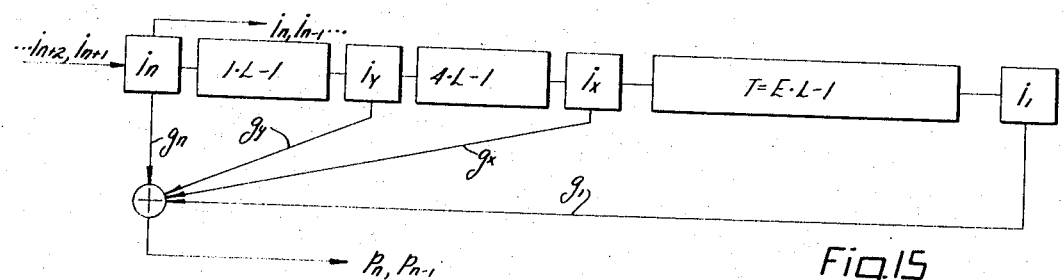
Figure 16:
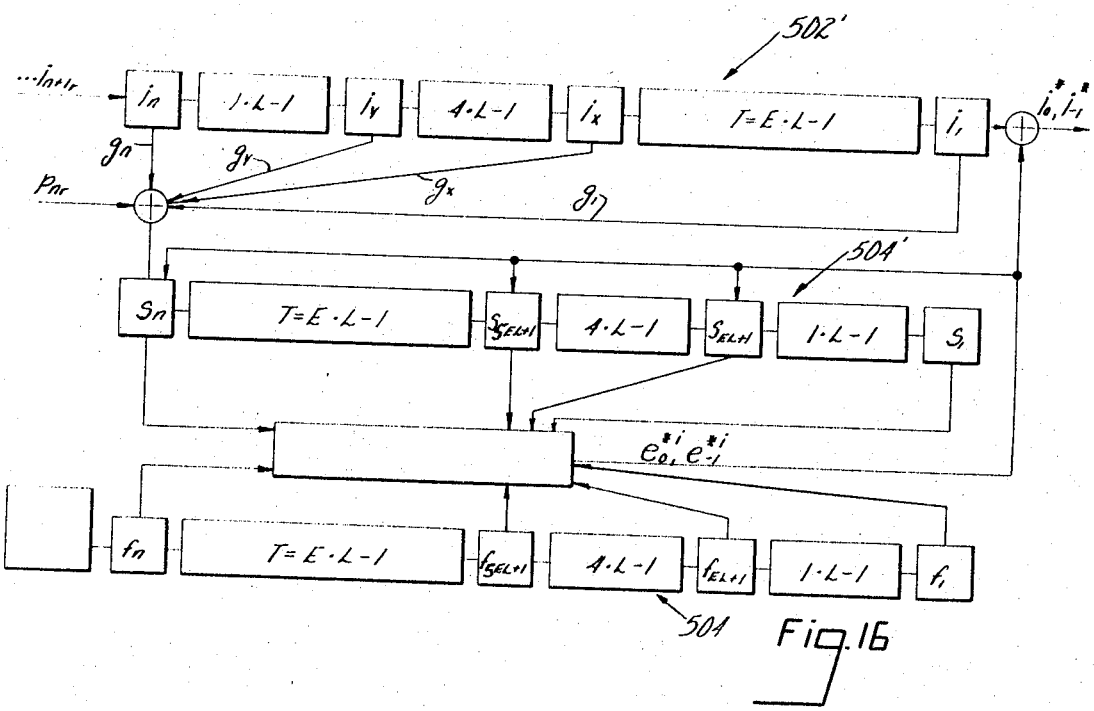
Figure 17:
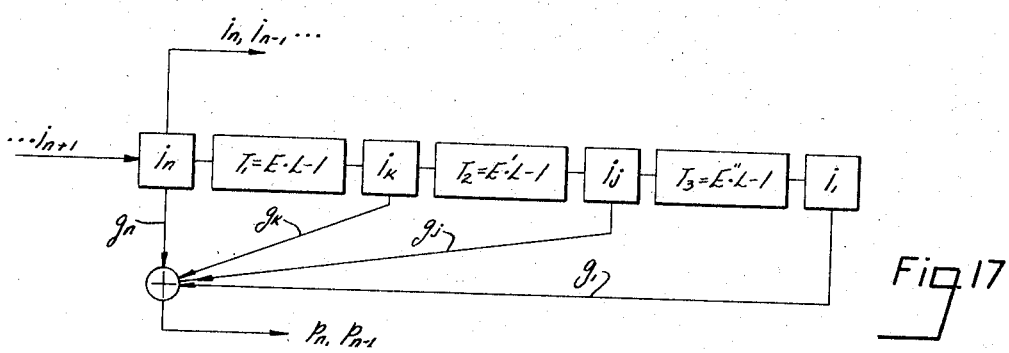
Figure 18:
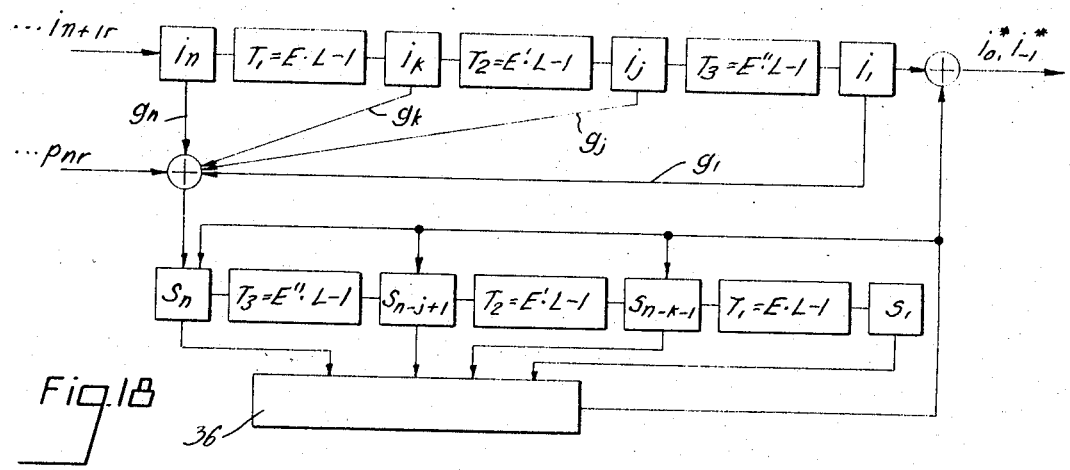
Figure 19:
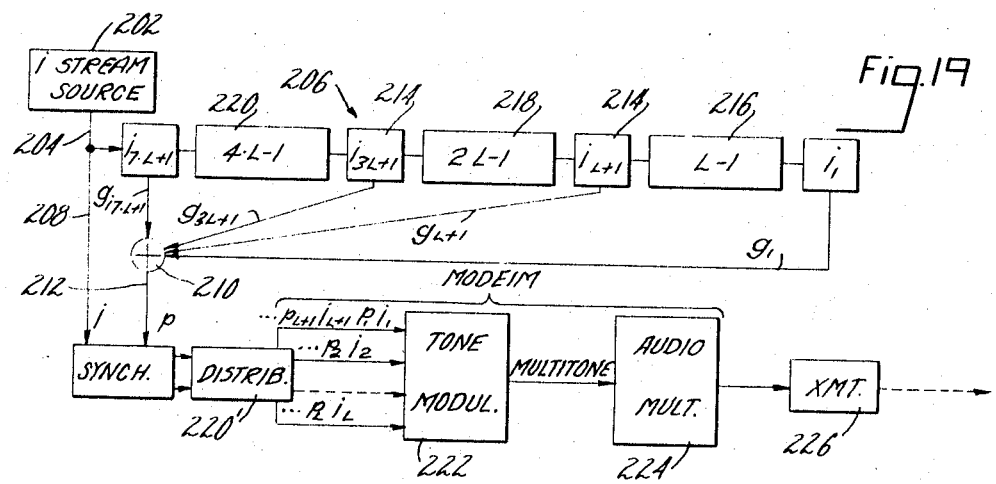
Figure 21:
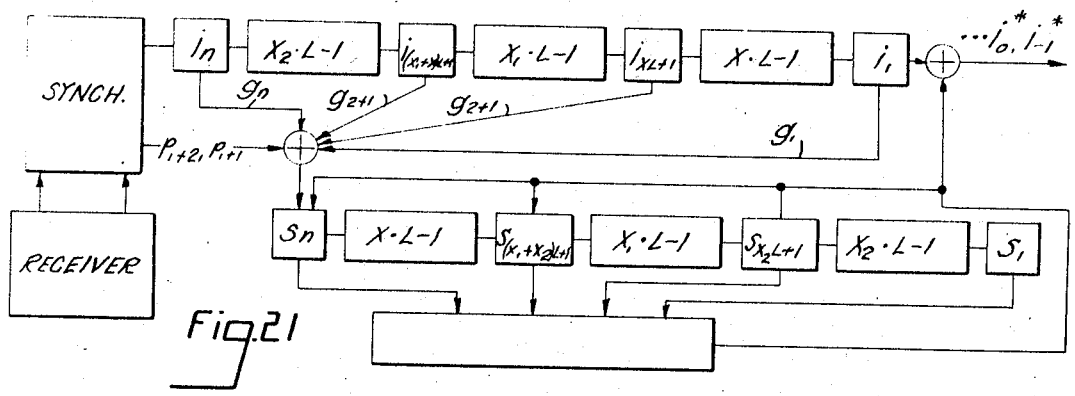
Figure 20:
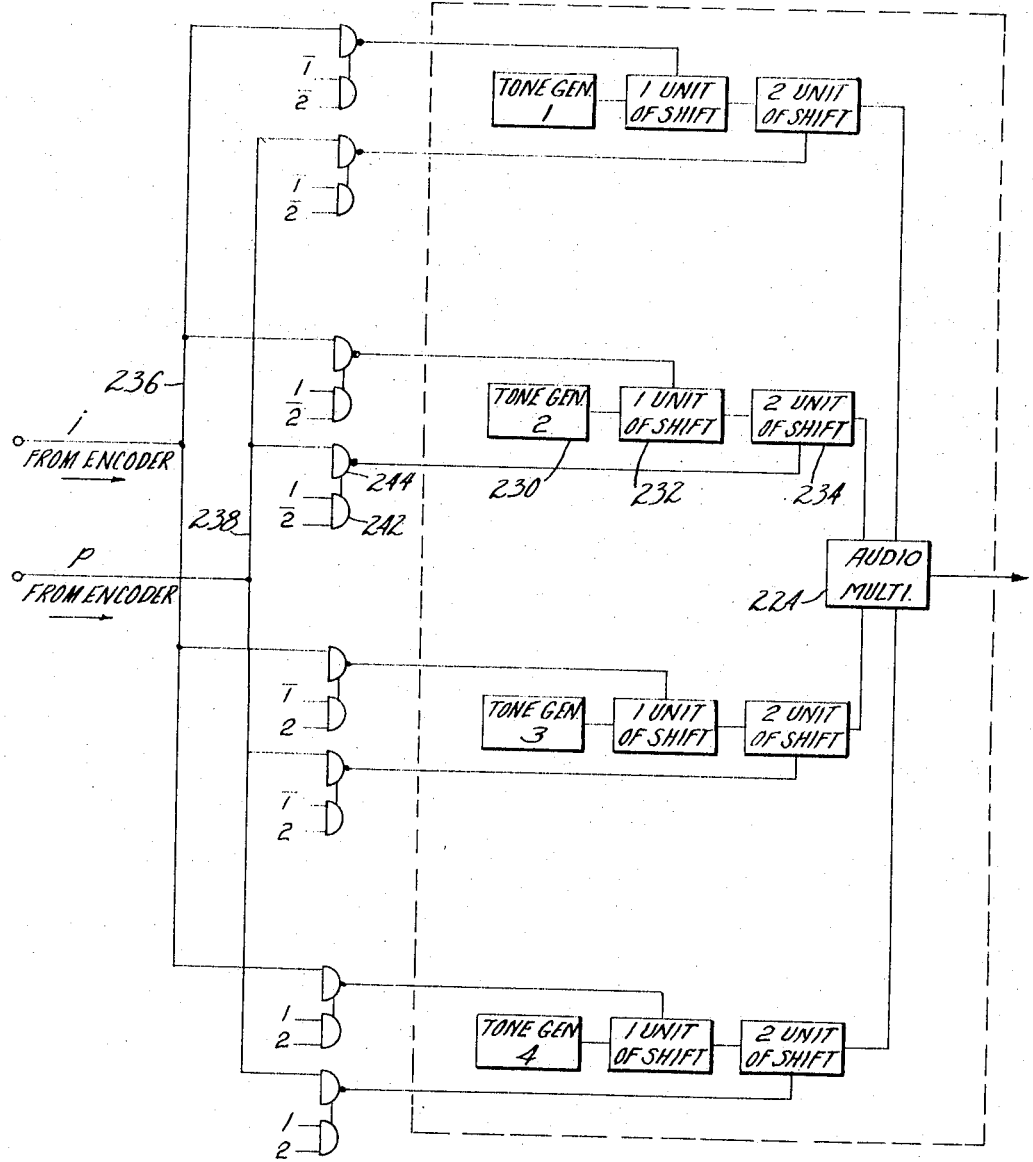
Figure 22:
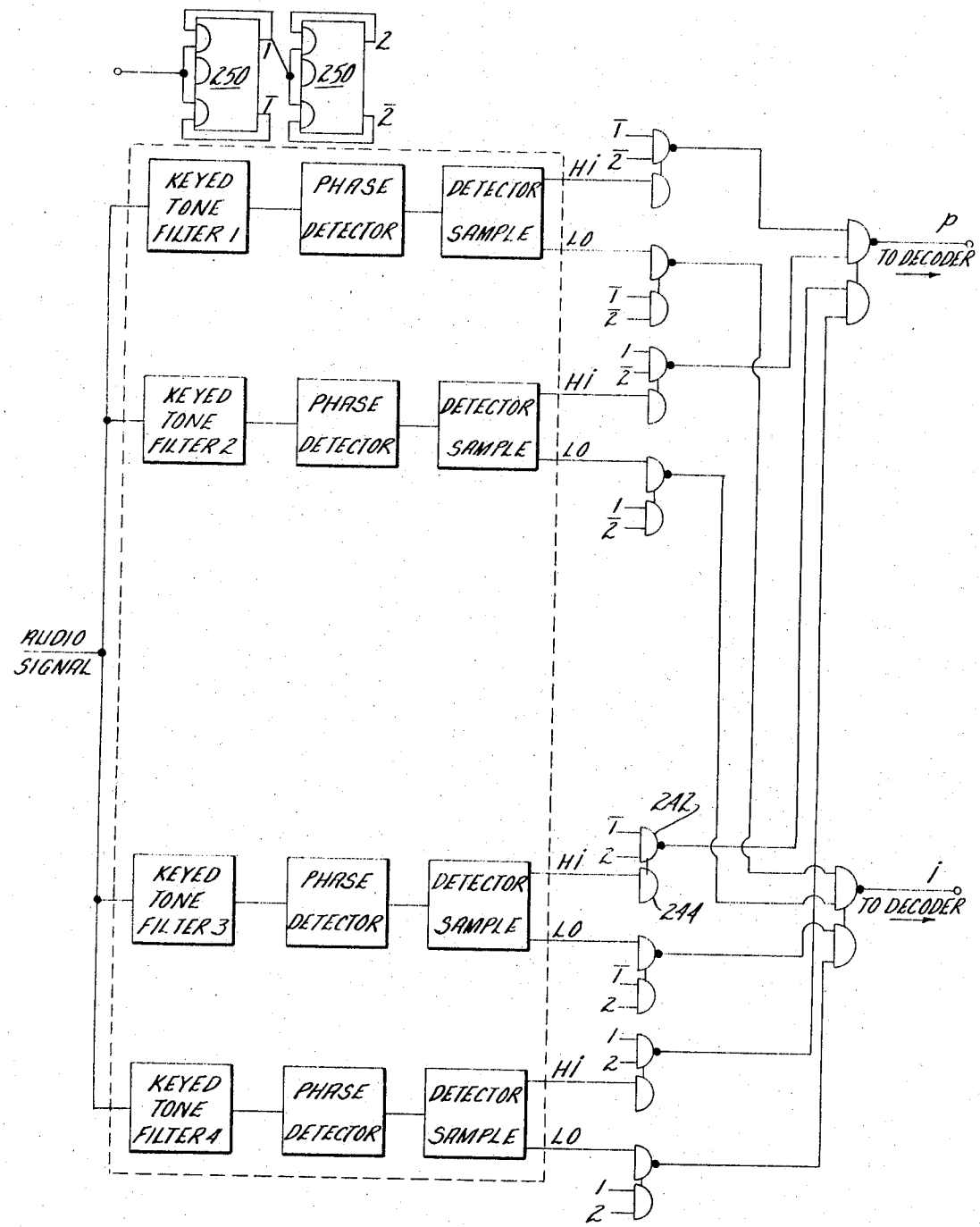

FIG. 10b illustrates a digitalization of the diagram shown in FIG. 10a;

FIG. 11, waveshape ($a$) illustrates signals, as represented by voltages over time and FIG. 11, waveshape ($b$) illustrates integrations of these signals, as can be accomplished by an integrator, for the purpose of reaching a decision as to the polarity of the signals;

FIG. 12a is a diagram indicating the divisions of time and voltage into which a single signal baud can be divided for integration;

FIG. 12b is a diagram of one of the sampling columns of FIG. 12a, indicating the relation of a "staircase" reference voltage to the sampling column;

FIG. 12c is a block diagram of means for generating the staircase voltage of FIG. 12b;

FIG. 12d is an overlay diagram of an actual signal, represented by a voltage that varies over time due to noise, and indications as to which of the voltage levels and times that are counted to accomplish the integration of that signal;

FIG. 13 is a block diagram of an integrator and means for determining the relation of the integrator count to the boundaries of FIGS. 10a and b;

FIG. 14 is a block diagram of a clock counter for controlling the integrator as well as the receiver timing pulses;

FIGS. 15 and 16 are block diagrams similar to FIGS. 1 and 2, respectively, of a diffuse, modular encoder and decoder adapted for use together, employing the tracking type of guard means;

FIGS. 17 and 18 are block diagrams similar to FIGS. 3 and 4, respectively, of a diffuse, modular encoder and decoder adapted for use together, employing the multiple delay type of guard means;

FIG. 19 is a block diagram of a modular encoder in combination with a channel device adapted to breakdown a data stream and transmit it by a number of circuits or tones;

FIG. 20 is a diagram in more detail of a preferred embodiment for use in FIG. 19;

FIG. 21 is a block diagram of a modular decoder in combination with a channel device adapted to form a single stream from a number of input streams;

FIG. 22 is an embodiment of the receiver of FIG. 21 which is adapted for use with the encoding-transmitting equipment of FIG. 20.

Referring to FIG. 1, there is given a diagram of a specific encoder for use with a diffuse code decoder which employs a tracking type of guard means. The information source generates a stream of binary digital information signals, or bits, $i$, which are progressed through a memory 502, here comprised of sequentially connected storage elements. At the moment shown information bit $i_n$ has just entered the encoder at the left side, $i_1$ has reached the last storage element on the right side, and information bit $i_{n-1}$ has moved to the $n-1$ storage element. In the memory 502 there is provided an extended section of storage means labelled T of length $n-4$ which may be hundreds or even hundreds of thousands of bits long depending upon the maximum probable length of the error bursts for the particular channel employed. In any event, to be considered a "diffuse" system herein, the section must be longer than the total number of tapped positions. Furthermore, when adapted for use with the Massey system preferably the extended section should be longer than the constraint length of a minimum length Massey code having the same random error correction capability.

The extended section of storage means T may take various forms such as a shift register having a definite number of stages, or as a real time delay such as a magnetostrictive element or a recirculating memory using such an element. In any case, it contains at any time a stream consisting of the $n-4$ bits which entered it during the previous intervals, putting out at any interval the bit which entered $n-4$ intervals before.

A modulo 2 adder 519 forms the sum of the information bits in tapped memory positions, shown at this moment to be occupied by $i_1$, $i_{n-3}$, $i_{n-2}$, and $i_n$, along memory taps $g_1$, $g_{n-3}$, $g_{n-2}$ and $g_n$, and the resultant modulo 2 sum is the redundancy bit $p_n$, corresponding to $i_n$, which satisfies the coding rule:

$$p_n = i_n + i_{n-2} + i_{n-3} + i_1$$

At the moment shown $i_n$ and $p_n$ are both ready for transmission.

Referring to the erasure channel decoder of FIG. 2, after transmission the received streams of information and redundancy bits are applied to the decoder as indicated. In the transmission process some of the bits may be altered, so a subscript $r$ is employed to indicate that they may be in error with $i_{1_r} = i_1 + e_1^i$ by modulo 2 addition and $p_{1_r} = p_1 + e_1^p$, $e$ designating the error component which has a value of "zero" when no error occurs and "one" when an error occurs.

At the receiver, in addition to the received streams of information and redundancy bits, an erasure or fade detector 520, part of the erasure type guard means, produces an indication $f$, here illustrated as a digital signal, when each bit in the received stream, or at least one out of a selected number of adjacent bits, e.g., $i_n$ and $p_n$, as shown here, is likely to be in error (or erased). Such an indication may be achieved in a variety of ways, but as an example, when the received bit in a high frequency radio system fades, the fact that it has faded, giving a high probability of error, can be observed by measuring the power of the received carrier signal, as is commonly done in an automatic gan control circuit.

In the diffuse decoder of FIG. 2 there is a memory chain 502′, identical to chain 502 of the encoder of FIG. 1, fed by the incoming information bits and a memory chain 504 of reciprocal form, fed by the output of a parity means comprising a modulo 2 adder 519′. The input to the adder 519′ is the set of information bits $i_{1_r}$, $i_{n-3_r}$, $i_{n-2_r}$ and $i_{n_r}$ according to the diffuse coding rule, and the received parity bit $p_{n_r}$. The output of the adder is a parity check signal, $S_n$ at moment shown. Still another memory chain 504′ is provided into which is fed the erasure data $f$ by detector 520 which detects when either of the received bits $i_n$ or $p_n$ is erased.

The object of this decoder is to decide whether $i_{1_r}$ is correct, or not. If it is incorrect, it is to be corrected, and whether corrected or not, delivered out to the right, while the next pair, $i_{n+1_r}$ and $p_{n+1_r}$ enter. Then the decoder will examine $i_{2_r}$ for errors in the same manner. The decoding process works as follows:

Consider the values of the orthogonal set of subsolution signals $S_1$, $S_3$, $S_4$ and $S_n$, and assume that there were no errors preceding $i_{1_r}$, which is true when the preceding coding decisions have been correct, as will be shown. In that case it is easily seen that these S's are given by the following set of equations:

$$S_1 = e_1^i + e_1^p$$
$$S_3 = e_1^i + e_3^i + e_3^p$$
$$S_4 = e_1^i + e_2^i + e_4^i + e_4^p$$
$$S_n = e_1^i + e_{n-3}^i + e_{n-2}^i + e_n^i + e_n^p$$

It should be noted that the S's depend only upon errors and not upon the actual values of the information and redundancy bits transmitted, and that these S's involve only bits near the beginning and end of the total constraint length of the diffuse code.

The correct value of $i_{1_r}$ can now be determined by examining the values of these 4 S's. The operation is as follows:

(a) No erasures: Examination of the equations shows that the decision device 36$f$ will correctly determine $i_1$ according to threshold logic with a threshold of 2, if there were not more than two errors present in the bits occurring in the four subsolution signals. This gives the code considerable power to correct random errors in the absence of erasure.

(b) Erasure at the input: If $f_n$ carries an indication of an erasure, it means that there is a high probability of error among the signals with subscripts near $n$. In this case the erasure data $f_n$ causes the suppression means within decision device 36$f$ to suppress $S_4$ and $S_n$. The decision device 36$f$ then is adapted to operate according to simple "and" logic, so that if both subsolution signals $S_1$ and $S_3$ are 1, $i_{1_r}$ is changed, otherwise not. This will be correct if there is not more than one $e=1$ among the four different bits involved in $S_1$ and $S_3$. It should be noted that $S_4$ could also be examined, using threshold logic, to correct if 2 out of 3 S's=1, but this would yield no increase in error correcting ability.

(c) Erasure at the output: If any of the erasure bits $f_1$, $f_3$, $f_4$ carries an erasure indication, it means that there is a high error probability among the signals with subscripts near 1. In this case the suppression means permits the threshold device to examine $S_n$ only, changing $i_{1_r}$ if $S_n$ is one and not otherwise. This decodes correctly as long as there is no error present in the four signals with subscripts near $n$ which occur in the subsolution signal $S_n$.

If, in decoding, $i_{1_r}$ was found to be wrong, it means that the four S's entering the decision logic contain a term $e_1^i = 1$, and this term is added out modulo 2 so that it will not interfere with the next step of decoding bit $i_{2_r}$. This is done by removal line 540′ shown in the diagram, which comes from the output of the decision device 36$f$ and, in addition to changing $i_{1_r}$ if it was wrong, also changes the value of $S_3$, $S_4$, and $S_n$. This establishes the condition referred to above that there were effectively no errors before $i_{1_r}$. If this removal is not used the error-correcting power of the decoder is weakened somewhat, but it still will have considerable correction ability.

Summarizing the behaviour of the decoder it can be seen that it will not only correct a considerable proportion of any random errors which occur but will also correctly restore entire sequences of error bursts if the duration of the error burst is not greater than $n-4$, which will be the case since the extended section of storage means T is longer than the maximum probable length of the error burst, and in practical systems preferably sized somewhat longer. Should the duration of such a sequence ever be greater than $n-4$, erasure indications would occur for both ends of the decoder which could be employed to energize an alarm.

In view of the general teaching of threshold decoding of convolutional codes, as given in U.S. applications Ser. Nos. 212,312, which has matured into Patent No. 3,303,-333, issued Feb. 7, 1967 and 299,534, to which reference is made, it is possible to provide equivalent encoders and decoders for other codes of rate ½, giving varying degrees of power in the correction of random errors, and similar apparatus can be made for codes of other code rates, e.g., ⅓. The essential idea is always the insertion of an extended section of storage means of length greater than the maximum probable error burst length in the appropriate places in the coder and decoder, and the use of a guard means.

Referring to FIGS. 15 and 16, the encoder and decoder of FIGS. 1 and 2 are modified to combine the diffuse and modular principles in the definition of the tap spacings.

For this embodiment the error repeat length is an integer designated by the letter L, and is a characteristic of the channel for which the system is adapted. Thus, in the case of an eight tone high frequency modem, with two adjacent bits, e.g. $i_1$ and $p_1$ applied to a single tone, so that $i_1$ $p_1$ and $i_9$ $p_9$ appear on the same tone, L is equal to 8. Needless to say L may be larger or smaller depending on the channel.

In FIG. 1 the extended section of storage means T has a length depending upon the maximum probable length of the error burst for the channel. According to the present aspect of the invention, this remains true for FIG. 15, but care is taken in sizing T so that the $g_1$ tap and the next adjacent tap $g_x$ are spaced apart an integral multiple of the error repeat length L. Thus, assume that in designing the encoder of FIG. 1, it was found that T should be 2099 bits long, making the spacing between $g_1$ and $g_x$ 2100 bits. It will be observed that 2100 is not evenly divisible by 8. Therefore, in accordance with the modular principle, T should be increased to 2103 bits in length, making the $g_1$ to $g_x$ spacing equal to 2104, a number evenly divisible by 8. More generally the length of T should be (1) greater than the maximum probable error burst length for the channel, and (2) should be equal to E multiplied by L minus 1, where E is an integer and L is the error repeat length of the channel.

Another change is necessary to the encoder of FIG. 1, which is to ensure that every code tap $g$ is spaced from its adjacent taps a modular distance. Thus for example a delay line of length $(4L-1)$ is inserted between the second and third tapped positions, and a delay line of length $1(L-1)$ is inserted between the third and fourth tapped positions, replacing the storage element designated $i_{o-1}$ in FIG. 1. The integers 4 and 1 may be replaced by other integers, depending upon the characteristics of the channel. Indeed, if, besides long bursts, short bursts of a predetermined maximum length are encountered in the channel, these integers may be selected to provide a multiple delay guard means, so that the coding system will have two different modes of operation, depending upon the length of the particular error burst residing in the decoder at any moment.

Referring to FIG. 16, the tap spacings of the decoder memory chain, the information chain 502′, the parity check chain 504′ and the erasure data chain 504, are correspondingly made modular with respect to the error repeat length L.

The action of the decoder with respect to error bursts is the same as with the system of FIGS. 1 and 2. However, it will be observed that all information bits $i$ and parity bits $p$ which play a part in decoding a given information bit, e.g. $i_1$, are spaced apart from each other by modular distances. Thus for decoding any $i$, e.g. $i_1$, we have the following syndromes which check $i_1$:

$$S_1 = e_1^i + e_1^p$$

$$S_{n-y+1} = e_1^i + e_{n-y+1}^i + e_{n-y+1}^p$$

$$S_{n-x+1} = e_1^i \times e_{y-x+1}^i + e_{n-x+1}^i + e_{n-x+1}^p$$

$$S_n = e_1^i + e_y^i + e_x^i + e_n^i + e_n^p$$

where $x = 1 + (EL-1) + 1 = EL + 1$
$y = 1 + (4L-1) + 1 + (EL-1) + 1 = (4+E)L + 1$
$n = 1 + (L-1) + 1 + (4L-1) + 1$
$\qquad + (EL-1) + 1 = (5+E)L + 1$ Let it first be assumed that a periodic error with the characteristic error repeat length L begins with $i_0$, thus $i_L$, $i_{2L}$, $i_{n-1}$ being in error. It is obvious that this error pattern is out of phase with $i_1$, hence $i_1$, as well as $i_{L+1}$, $i_{2L+1}$ ... $i_n$ will be decoded correctly, with no interference by the error pattern. Indeed it follows that ⅞ of the message is decoded correctly, and indeed with the full random and burst correcting powers of the code remaining intact, to combat non-periodic errors.

It will be apparent to those skilled in the art that random diffuse coding systems of the tracking type are not limited to the Massey decoding system. For example mention is made of the system described in U.S. application Ser. No. 438,565 filed Mar. 10, 1965 by Robert G. Gallager.

Needless to say the number of taps, and their particular spacing can be varied so long as the modular spacing is preserved.

Referring to FIGS. 3 and 4, let us now consider a diffuse code system employing the multiple delay type guard means, a system that is appropriate, for instance, when there is no erasure data available, i.e., no indication when any particular received bit is likely to have a high error probability.

In the coder of FIG. 3 the sequential storage 502a contains three extended sections of storage means: $T_1$, $T_2$, and $T_3$, set off by tapped positions $g_1$, $g_j$, $g_k$ and $g_n$. As with the foregoing embodiment each section is longer than the maximum probable length of the error bursts, and substantially longer than the total number of tapped positions.

Two of these extended sections, e.g. $T_1$ and $T_2$, serve as guard means to guard the threshold device 36 (FIG. 4) when the error burst is in the decoder but not wholly in the third section, $T_3$.

The redundancy signals are computed in accordance with the coding rule $p_n = i_1 + i_j + i_k + i_n$. In FIG. 4 the corresponding decoder is shown. Computation of the values in the second sequential storage chain 504a, without any erasure indication, gives the following equations:

$$S_1 = e_1^i + e_1^p$$

$$S_{n-k+1} = e_1^i + e_{n-k+1}^i + e_{n-k+1}^p$$

$$S_{n-j+1} = e_1^i + e_{k-j+1}^i + e_{n-j+1}^i + e_{n-j+1}^p$$

$$S_n = e_1^i + e_j^i + e_k^i + e_n^i + e_n^p$$

The numbers $j$, $k$ and $n$, which represent tapped memory positions, preferably are chosen so that the four S's are self-orthogonal, preferably by establishing $j = T$, $k = 2T$, and $n = 4T$, which gives a degree of random error correcting ability even when an error burst is within the decoder. If these are not self orthogonal, other S's may be combined with them by the composite subsolution techniques described in the Massey applications cited above to form orthogonal subsolution signals so that no error component other than the $e_1^i$ occurs in more than one of the sets of subsolution signals. These subsolution signals will then serve for a correct decision as to the value of $e_1^i$ if there are no more than two random errors present in accordance with the fixed threshold logic rule: Change $i_{1r}$ if and only if more than two of these four S's are equal to 1. $S_n$, $S_{n-k+1}$ and $S_{n-j+1}$ are changed when $i_{1r}$ is changed as in the earlier scheme.

With regard to error bursts, examination of the general equations shows that if a burst of errors whose length is not longer than $T_1$ or $T_2$ or $T_3$ moves through the decoder, where the rest of the information bits in the decoder on both sides of this stream are free of error, and where the length of one of the extended sections of storage means, e.g. $T_1$, bears the relation $T_1 \geq 2T_2$ and $T_1 \geq 2T_3$, the fixed decoding rule will still decode correctly. Thus a decoder of this form is capable of correcting a substantial number of random errors, and of correcting continuous bursts of significant length.

It will be observed, by synchronization of information and redundancy bit streams that each rebundancy bit, e.g. $p_r$, containing $e_n^p$, can be multiplexed and transmitted simultaneously, e.g. in an adjacent subchannel, with the corresponding information bit $i_{nr}$, containing $e_n^1$ which appears in same subsolution equation. Both are in the same error burst span and spaced by an error burst span from every signal in at least half the other subsolutions. The same results can be obtained by interleaving the two bit streams so that the corresponding signals, e.g. $p_n$, which checks $i_n$, and $i_n$ itself are immediately adjacent each other during transmission as described in the Massey application cited above.

Referring to FIGS. 17 and 18, the encoder and decoder of FIGS. 3 and 4 are modified to combine the diffuse and modular principles in the definition of the tap spacings.

The numbers represented by E, E', and E'' are integers, and L represents the error repeat length for the channel. Thus, as shown, the taps are spaced apart by even multiples of L.

The burst operation of this system is the same as FIGS. 3 and 4, while the protection against periodic errors is the same as with the embodiment of FIGS. 15 and 16.

It is to be observed that the system of FIGS. 17 and 18 is very simple. It has the basic virtues of the Massey system, diffuse protection against error bursts, and modular protection against periodic errors. It will be apparent that one further virtue is the ability to handle more than one data stream by a single decoder, by multiplexing the bits in accordance with the module of the system. In such a case each data stream is processed separately, identically to a single tone of a modem, hence errors in the other streams do not affect it. Such multiplexing can be employed at the encoder, decoder, or both.

Distinct transmission lines may be employed for the various streams, in which case, just as with the high frequency radio channel, there is a definite error repeat length. This length is based upon the spacing in the multiplexed stream between bits of an individual stream which were adjacent each other before multiplexing in the individual transmission lines.

Referring now to FIG. 5 there is shown diagrammatically a diffuse encoder used with a multiple delay type guard means which is capable of handling various transmission rates without physically changing the memory taps.

In this embodiment the extended sections of storage means $T_1'$, $T_2'$, and $T_3'$ are in the form of delay lines, preferably of the well known magneto-strictive or piezo-electric-activated acoustical types, each longer in terms of real time than the maximum proable duration D of the error bursts. As suggested above this duration is related to the maximum probable length L of the error bursts by the formula $D=L/R$, where R is the digital transmission rate. Magnetic recording drums and discs are also suitable memories here.

This embodiment takes advantage of the fact that D for certain transmission paths is a constant for various rates R.

The capability of handling various transmission rates is achieved simply, if the bits are not already synchronized, by synchronizing the bits in the system with real time so that they will reach the various taps in a stable relation to each other. For this purpose a real time clock, e.g. a crystal oscillator, is employed. A buffer receives the stream of asynchronous signals, and the crystal clock A', B', or C' triggers a buffer read out means from which the synchronized signals are emitted, in accordance with well known circuit techniques.

The decoder used with this encoder can be of the multiple delay type already described, synchronized with the encoder by an identical crystal clock. Also the decoder may be provided with an asynchronous converter to restore the corrected information bit stream to the original rate, as may be desired in the case of Teletype transmissions in which start and stop pulses may be removed preceding the encoder and replaced following the decoder.

It will be understood that the use of delay lines for the extended sections of storage means, $T_1'$, $T_2'$, and $T_3'$, and the advantage of operating with various digital rates, can also be accomplished in the system of the invention that has the erasure type of guard means. In such system it is possible to employ a single delay line at the decoder to perform the function of the extended sections of storage means in both the information and erasure memories, the delay line having three levels for each signal, indicating 1, 0 or erasure.

Another desirable feature of delay lines is that, by simple modification, they can be employed for laboratory evaluation of a channel to determine the maximum probable length of its error bursts where such is not already known. For this purpose the delay lines at the encoder and decoder are provided in extremely long lengths so as to be longer than needed, and the outputs are taken from the delay lines in successive experiments from various points along their lengths, the corresponding points always being used in the encoder and decoder so that encoder and decoder operate by the same coding rule for any one experiment. The decoder operation can be monitored to evaluate the error correcting performance and the longest length of delay line in which the error rate exceeds acceptable values can thereby be established as the maximum probable error burst length for the channel. Also, a point spaced further by a safety factor along the delay line can be taken as establishing the minimum delay line length for commercial models of the system. By similar tests, the error repeat length L can be found. And similarly, a system provided with delay lines and with an appropriate series of crystal clocks can be employed to determine the optimum transmission rate for a given code and transmission path.

In FIG. 6 there is shown a diffuse decoder of the tracking type, adapted to analyze the arriving bits for erasure, and having shift register banks for the extended section of storage means and a digitalized threshold device. In this embodiment, except where otherwise indicated, each small square represents a shift register element T-654, manufactured by Engineered Electronics Company of California (EECO), catalog number T-654, as shown diagrammatically in FIG. 6a in which the encircled numbers are the manufacturer's pin numbers.

This embodiment is adapted for use with a high frequency radio Teletype channel, with a keying rate of one signal every 13,900 microseconds, and it is contemplated that the information and redundancy bit streams will be transmitted on separate sub-channels in the same voice-band channel, in synchronism.

Referring to FIG. 6 the information stream is made available in both its value, indicated by $I_r$, and the negation of its value, indicated by $\bar{I}_r$, in different polarities of static voltage level at the input of the Information Shift Register 4. A conventional shift pulse source, not shown, applies a shift pulse to the I shift line 8 following each time A that a new pair of signals appears at the receiver 22 output. The $I_r$ stream is thus pumped down the I shift Register 4. After each shift has settled down, EXCLUSIVE-OR gates 10, 12, 14 such as EECO catalog number T-421, generate the appropriate simulated redundancy signal, e.g., $p_{ns}$, from the four I taps concerned, $g_1$, $g_{n-3}$, $g_{n-2}$ and $g_n$. These taps are clustered at the beginning and end of the I shift register 4, there being an extended section of storage means $T_i$ of e.g. 42 digits separating the adjacent tapped positions $g_1$ and $g_{n-3}$, this length being greater than the maximum probable length for error brusts on the Teletype channel here involved.

The structure thus far described is duplicated for use as the encoder for the system.

The simulated redundancy signal from EXCLUSIVE-OR gate 14 is then compared with the corresponding received redundancy bit from redundancy bit stream $P_r$ by parity means 18 which is also an EXCLUSIVE-OR gate, and the output parity check S is passed to parity check register 20, which also stores the negation of the value, $\bar{S}$, generated by inverter 23, such as EECO catalog number T–136.

In this embodiment the settling time while S is derived is negligible.

For each shift, the receiver 22 makes a decision as to the polarity of the bits from the information and parity channels and the quality of each, that is, whether or not either is erased, and if either of the synchronized bits, e.g. $i_{n_r}$ or $p_{n_r}$, is judged erased, a "1" erasure signal $f$ is generated, otherwise "0," and directed to erasure register 21.

As will be described more fully in connection with FIG. 13, preferably the erased quality of an information or redundancy bit is determined by examining the amount the bit, when transformed into a voltage by the receiver, varies from a neutral value lying between the values assigned to "0" and "1" polarities. An undisturbed bit produces a voltage that departs a standard expected amount from the neutral value in many modulation schemes, such as frequency-shift keying received in a discriminator, or amplitude modulation received with a slow automatic-gain-control, or discrete phase modulation, all as used for transmission of digital data. Whatever the modulation scheme, or the transmission medium, or the cause of the disturbance to the arriving bit, it is likely that a disturbance to a bit in transmission will not produce the standard size voltage. Hence it is statistically proper to judge a bit "erased" if the size of the voltage departs more than a certain predetermined amount from the standard value. It should be understood, however, that other criteria may be used in addition, or instead. The decoder operation is the same whatever the criteria that were used to establish "erasure."

After a pair of incoming bits, e.g. $i_{n_r}$ and $p_{n_r}$ are caused to produce their appropriate polarity values by the receiver 22, the values are stored in I and P flip-flops 24, 26, e.g. EECO flip-flop catalog No. T–101, shown in FIG. 6b, and appropriate erasure signals, $f_n^i$ and $f_n^p$, are then formed and stored in flip-flops 27 and 28, also EECO, T–101.

The decoder operates sequentially and produces a single decoding solution each time the receiver supplies a new pair of $i$ and $p$ bits. In the following description of this procedure the instant when a new pair of $i$ and $p$ bits is supplied by the receiver 22 is designated as time A, and the microsecond intervals, following time A and well before time $A_2$ when the next pair of $i$ and $p$ signals is supplied, are designated $A+1$, $A+2$, etc.

In a typical system, at time $A+29$ a shift pulse is applied to the I shift register 4 on shift line 8, as indicated by the arrow, causing the first stage of the I shift register to pick up $i_{n_r}$ from flip-flop 24. At the same time the second stage of the I register picks up $i_{n-1_r}$ from the first stage, and so on down the I register, causing $i_{1_r}$ to enter the last stage of the register, as shown in FIG. 6.

Also at time $A+29$, the erasure signals $f$, to $f_{n-1}$, which are already stored in their F shift register 21 are shifted down one stage, and the initial stage 21', which is simply a flip-flop T–101 rather than shift register T–654, is reset to "0" by shift register line 8' leaving a vacancy for the erasure signal $f_n$ that will be formed for the latest pair of signals, $i_n$ and $p_n$.

The I register 4 is allowed to settle down and generate its version of $p_{n_s}$ through tap connections $g_1$, $g_{n-3}$, $g_{n-2}$ and $g_n$, and EXCLUSIVE-OR gates 10, 12, 14, $p_{n_s}$ being the so-called simulated redundancy bit. $p_{n_s}$ Has the same information components as $p_n$, that is $i_1$, $i_{n-3}$, $i_{n-2}$ and $i_n$, but is affected with any errors, $e_1^i$, $e_{n-3}^i$, $e_{n-2}^i$ and $e_n^i$, that have occurred in the information bits during their transmission. This step takes no longer than three microseconds, hence at time $A+32$ the value of $p_{n_s}$ will appear at the output of EXCLUSIVE-OR gate 14.

The value of $p_{n_s}$ is applied to the parity means 18 EXCLUSIVE-OR gate, while the received redundancy bit $p_{n_r}$, equal to $p_n+e_n^p$, is also applied from receiver flip-flop 26.

By time $A+33$, the parity means 18 adds modulo 2 $p_{n_r}$ and $p_{n_s}$ and produces parity check $s_n$, constituting the modulo 2 sum of errors in all of the received bits being consulted.

At time $A+76$, through the means of a pulse on shift line 8'', the first stage of the S register 20 picks up $s_n$ and each older $s$ is shifted one stage down the register. The initial stage of the S register, containing $s_n$ in FIG. 6, as well as certain other stages, 20a, 20b, 20c, is a special shift register element able to be reversed on command by a pulse on its change-state terminal, this element being shown in FIG. 6b. This arrangement is for removing the errors of information signals that have previously been decoded, an operation described in the cited Massey applications.

Also, by time $A+76$ the erasure decision $f_n^i$ and $f_n^p$ have appeared in output flip-flops 27 and 28. The output of each flip-flop is connected to a PULSE-AND gate, 30 and 31 respectively, EECO catalog No. T–448, shown in FIG. 6b. Upon the application of a timing pulse to these PULSE-AND gates at time $A+76$, if either flip-flop, 27, 28 is in the "1" state indicating erasure in $i_n$ or $p_n$, respectively, its gate 30 or 31 will pass a pulse to set the first stage 21' of the F register 21 into a "1" state. If both $i_n$ and $p_n$ are erased, this only confirms the "1" state of the first stage of the F register, and if neither is erased, no set pulse will pass the gates 30, 31, and the first stage of the F register remains in the "0" state in which it was reset at time $A+29$. Thus it will be seen that the erasure streams $F^i$ and $F^p$ are combined sequentially by NON-EXCLUSIVE-OR logic, to provide a single erasure stream F, and at the time in question $f_n$ is entered into the F register 21, $f_1$ already having been advanced to the last stage.

The correct value of $i_{1_r}$ can now be determined. The various modes of operation are as follows:

(a) NO ERASURES

The threshold circuitry will consult the S register 2 through appropriate taps for the subsolution signals $S_1$, $S_3$, $S_4$, cluster beyond one end of an extended section $T_s$ of storage means corresponding in length to $T_i$ in the I register, and $S_n$, residing beyond the other end of $T_s$. If no erasures are registered for any of the received information and redundancy bits that were consulted in forming this set of subsolution signals, the threshold logic is identical with that of the normal rate ½, constraint length 12 Massey code capable of correcting two random errors as defined e.g. on p. 50 of Massey application Ser. No. 299,534. Specifically the logic is, if a majority, i.e. ordinary arithmetic sum 3 or 4, of the four S taps shows a "1," change $i_{1_r}$ to the opposite binary value, otherwise use the received value of $i_{1_r}$.

Referring still to FIG. 6 in the preferred embodiment this threshold logic is digitalized, the threshold device including five gates 32, 34, 36, 38, 40, NOR gates EECO catalog number T–645.

For this embodiment, a majority of the four subsolution signals S numbers either three or four, and there are four ways of having three, since for each way one of the four S's should be omitted. Each of the four gates 32, 34, 36 and 38 is connected through emitter followers 25, EECO catalog number T–114, to the appropirate S stages to operate in one of these ways, hence if any one or more of them operates, this constitutes the solution that $i_{1_r}$ should be changed, and if none of them operates, this constitutes the solution that $i_{1_r}$ should not be changed. The fifth gate, 40, is connected to reduce these solutions to a single solution signal. It is connected to the outputs of all of the four gates 32, 34, 36 and 38, and is connected to not operate if one or more of these gates is operated; its operated state thereby signifying "Don't change $i_{1_r}$." The appropriate erasure stages in the F register are also consulted in a manner to be described, and if no erasures are indicated, the solution signal from gate 40 representing the majority vote of the four S's controls the correction of $i_{1_r}$. The output of gate 40 appears in less than 3 microseconds and hence is available at time $A+79$.

Although the function of the first four gates 32, 34, 36 and 38 can be expressed and implemented with the more common "AND" and "non-exclusive-OR" logic, it is preferred to employ the NOR logic, as shown, making use of the negation of the values of the various signals, which is available from their storage registers. Accordingly, the gates 32, 34, 36 and 38 are NOR gates, having three inputs each, and adapted to indicate a "1," or activation, only when no inputs are "1."

If we had employed conventional "AND" logic for gate 32, for example, we would have connected its inputs to $S_1$, $S_3$ and $S_4$. Its activation would mean "$S_1$ and $S_3$ and $S_4$ are all '1'." Using the NOR gate 32 with inputs from $\overline{S}_1$, $\overline{S}_3$, and $\overline{S}_4$, its activation must mean "NEITHER $\overline{S}_1$, NOR $\overline{S}_3$, NOR $\overline{S}_4$ is '1'," which clearly means the same as the first statement. Hence, a "1" output from gate 32 means that $S_1$, $S_3$, and $S_4$ are "1."

Similarly, gates 34, 36, and 38 when activated show the presence of the other possible triple sets of "1." If we had combined these in the usual non-exclusive OR gate, its output activation would signify that one or all of the triples was activated. Since they are combined in a NOR-gate, 40, the significance of the activation of 40 is that neither the triple of 32 nor that of 34 nor that of 36 nor that of 38 is present. Hence, activation of 40 means "Don't correct $i_{r_1}$" (and deactivation of 40 means "correct it"). The NOR gates are used in preference to the more easily understood AND and OR gates because their construction permits cascading them in an indefinitely long sequence.

To determine that in fact no erasures affected the S's that were consulted, the F register is consulted for erasure signals $f_1$, $f_3$, $f_4$, and, separated therefrom by an extended section of storage means $T_f$, two stages shorter than $T_s$ or $T_l$, the erasure signal $f_{n-3}$, $f_{n-2}$ and $f_n$. By reference to the equations for $S_1$, $S_3$, $S_4$ and $S_n$ given above, it will be seen that erasure data for all consulted bits are represented, always, however, on the assumption that no bits preceded $i_{1_r}$ and $p_{1_r}$ into the decoder, or on the similar assumption, that all errors appearing in preceding bits have been corrected and their values removed from the S register.

The taps to the assertion side of the latest stages of the F register, $f_{n-3}$, $f_{n-2}$ and $f_n$, cover a very few stages, as compared to the large number represented by extended storage means $T_f$. Collectively these three stages are called "PRESENT ERASURE," as they represent the latest bits to arrive at the decoder, e.g. $i_{n-3}$. A single NOR gate 44, EECO, T-645, receives these taps, and generates a "1" output only when all inputs are "0," the "1" output signifies the negation of PRESENT ERASURE. An inverter 46, EECO, T-136, receives the output of NOR gate 44, and a "1" at its output signifies PRESENT ERASURE, and the line is so labeled.

In similar fashion the last four taps to the F register, beyond $T_f$, cover only a few stages compared to $T_f$, and are collectively called "PAST ERASURE," and generally correspond to the time of arrival of $i_{1_r}$. A single NOR gate 4 receives these taps, excepting $f_2$ which is not represented in the S's, and generates a "1" output only when all inputs are "0," the "1" output signifying the negation of PAST ERASURE, and an inverter 50, similar to inverter 46, puts out PAST ERASURE.

Another NOR gate 52, EECO, T-645, provided to allow the output of "DON'T CHANGE" gate 40 to control the change only if there are no erasures in the consulted bits. Its inputs are PRESENT ERASURE, PAST ERASURE and DON'T CHANGE and its output when "1" signifies "NO-ERASURE CHANGE," meaning that all of the $f$ inputs are "0," hence none of the consulted signals are erased, and the majority vote of the S's favors change $i_{1_r}$. The output of NOR gate 52 is input to NOR gate 60, EECO, T-645, and inverter 62, EECO, T-136, which produces a change to $i_{1_r}$ in a manner to be described after the other modes of operation are explained.

(b) ERASURE AT THE INPUT

If there is a present erasure, it is desired to alter the decision logic to suppress the latest signals, i.e. parity check $S_n$. The decoding procedure is carried out by consulting only the signals at the other end of the I register, spaced from the erased signals by the extended section of storage means $T_l$, these signals being present in $S_1$, $S_3$ and $S_4$. Under these conditions, if two of the S's are 1, then $i_{1_r}$ should be changed, this being capable of proper correction in all cases when one random error occurs in the signals being consulted. Little, if anything, is gained by consultation of all three S's, since the code is now only single random error correcting, hence $S_4$ closest to $T_s$ is not consulted.

For carrying out this logic a NOR gate 56, EECO, T-645, accepts as inputs $\overline{S}_1$, $\overline{S}_3$, PAST ERASURE, and the negation of PRESENT ERASURE, and a "1" output signifies that all inputs are equal to "0," the output being accordingly labeled PRESENT-ERASURE CHANGE. This output is directed to NOR gate 60 and inverter 62.

(c) ERASURE AT THE OUTPUT

If there is a past erasure, it embraces $i_{1_r}$, the bit being decoded, and the value assigned to it by the receiver is untrustworthy. But the bits at the input, being spaced from the erased bits by the extended section of storage means $T_l$, may be taken as being much more reliable. Accordingly, $S_1$, $S_3$ and $S_4$ are suppressed and $S_n$ is used to change $i_{1_r}$ if the value assigned to $i_{1_r}$ by the receiver 22 is in error. This is done with no random error correcting capability. The logic is that $i_{1_r}$ should be changed if $S_n$ votes for it.

For carrying out this logic a NOR gate 58, EECO, T-645, accepts as inputs PRESENT ERASURE, the negation of PAST-ERASURE, and $\overline{S}_n$, and a "1" output signifies that all the inputs are equal to "0," this output being accordingly labeled PAST ERASURE CHANGE. This output is directed to NOR gate 60 and inverter 62.

(d) ERASURE AT BOTH INPUT AND OUTPUT

If there are both present and past erasures the capacity of the decoder is temporarily exceeded, and an alarm can be given by means of and-gate 57, EECO, T-650, and PULSE-AND gate 59, EECO, T-448. This condition may occur on the rare occasions when the length of the error burst exceeds the predetermined maximum probable length. None of the three change gates 52, 56 or 58 puts out a "1" to NOR gate 60 under this condition, hence the signals in the I register pass from the decoder without change.

In the event that one of the three change inputs to NOR gate 60 is a "1" then the output of inverter 62 is a "1," signifying "Change $i_{1_r}$." These inputs appear by time $A+79$, the various chains of NOR gates taking about 3 micro-seconds to settle down to a stable presentation. The NOR gate 60 and inverter 62 survey the results of the three modes, and produce a change signal by time $A+81$, which is applied to the logic control of PULSE-AND gate 64, EECO, T-448. At time $A+96$, as indicated, a timing pulse is applied to PULSE-AND gate 64, and if the signal on the logic control is "1," the timing pulse passes through the gate 64, and after being amplified by conventional means 65, EECO, T-165, is transmitted along change line 71, through emitter follower 25, to the change-state input 66 of the final stage 4' of the I shift register in which $i_{1_r}$ resides. This stage, a special shift register element as shown in FIG. 6b, accordingly changes states, producing the corrected signal $i_1^*$.

The output of this last stage of the I register will have shown the uncorrected value of $i_{1_r}$ for the interval $A+29$ to $A+96$, and may be used for monitoring purposes.

If $i_{1_r}$ is corrected it is also desirable for future use, to reverse those S's in the S register that were formed using $i_{1_r}$, to add out the error $e_1^i$. Accordingly, the output of the PULSE-AND gate 64, equal to the value of $e_1^i$, is applied through change line 71, through emitter followers 25, to inputs 68, 70 and 72 to the appropriate S stages, $S_n$, $S_4$ and $S_3$.

It should be pointed out that the type of construction of the embodiment of FIG. 6 is easily implemented by other makes and types of components and is readily adapted to error correcting codes of higher powers through the use of more memory stages beyond the ends of the extended sections $T_i$, $T_s$ and $T_f$, with appropriate taps, and the same principles of construction can be used with other code rates. Also the fade register 21 can be shortened by the combination of fade data for adjacent bits in the $i$ and $p$ streams with little loss in accuracy.

With regard to the receiver 22 in FIG. 6, a preferred form of erasure detector for use therein will now be described.

Preferably the erasure detector means generates a signal, e.g. $f=$"1," whenever the voltage produced by the received bit being judged is not in the range of standard values. A receiver of the type here employed requires decision circuitry for judging the polarity of the voltage produced by the received bit, relative to a neutral value, the two polarities representing "0" and "1," and it is preferred to include the erasure detector as part of this polarity decision circuitry.

The receiver 22 of FIG. 6, may, for instance, receive frequency-shifted signals keyed at a steady interval of 13,900 microseconds. The deviation of a frequency shift may be ±42.5 c.p.s. Referring to FIG. 7 this frequency shift-keyed signal (called FSK hereafter) is formed at the transmitter by a frequency shift keyer 82 from the output of the encoder 80, the keyer also being provided with an input from an audio oscillator 84, the resultant FSK signal being centered about a given frequency in the audio band. This FSK signal, and similar ones centered about other frequencies in the audio band are combined by a multi-tone combiner 85, into a unit audio band, are hetrodyned up by means 86 to the High-Frequency band, and by HF transmitter 88 transmitted by radio, generally with the aid of ionospheric reflection.

Referring to FIG. 8 the receiver 22 comprises an HF receiver 90 taking input from an antenna, a voice band hetrodyne translator 92 returning the signal to the original voice band, a frequency selective filter 94, which separates the received FSK audio signal of the example from the others, and a discriminator 96. The discriminator operates to produce a plus or minus voltage varying in magnitude directly with the deviation of frequency from the center value, the polarities of these voltages representing "0" and "1."

Referring to FIGS. 9a–i as well as to FIGS. 7 and 8, to understand the operation of the signal chain let us follow the history of the bit series 1011 (arbitrarily chosen) through the encoder and decoder. The Data Source presents this as a series of steady voltage levels with negligble noise variation and with fast, clean transitions. This pattern is shown in FIGURE 9a. If we ignore time delays as we do throughout FIGURE 9, we may visualize the same wave form emerging from the Information output of the ENCODER 80. FIGURE 9b shows the resultant wave issuing from the FSK modulator 82 and FIGURE 9c the wave as hetrodyned by means 86 to the High Frequency region and transmitted (for clarity these two waves are shown unrealistically coarse. FIG. 9c shows only the one subchannel; the others would be added to this wave).

For a perfect transmission, the wave arrives at the receiver looking like 9c, is presented to the discriminator 96 looking much like 9b, and emerges from the discriminator looking like the rounded waves of FIGURE 9d. The rounding may be thought of as occurring due to the action of the frequency-selective filter 94, but is in any event a necessary result of efficient sharing of the voice band among the subchannels.

Various distortions in the discriminator output 96 are shown in the rest of FIGURE 9. FIGURE 9e shows a wave with a realistic amount of channel noise present. Note that at times during the cycle the discriminator output appears in the wrong polarity. In normal (asynchronous) teletypewriter applications, to which the invention is readily applicable, these spurious swings would be combatted by a low-pass filter, whose output would appear as at FIGURE 9f. For the present preferred synchronous embodiment of the invention it is advantageous to employ a keyed integrator 98, FIG. 8, which starts at transition time A at zero level, integrates the discriminator 96 output over time, and makes a polarity decision at the end of the signal period just before returning to zero again at the next transition time $A_2$. The integrated wave is shown as FIGURE 9g. A novel digital embodiment of this integrator is used in the present embodiment.

FIGURE 9h shows the discriminator 96 output for the condition that the energy of the received signal is temporarily weak because of attenuation in the ionospheric path, or partial cancellation during a number of signals by a second path whose signal is out of phase at the High Frequency rate. The result is a decrease in the true signal wave and increase in the noise. The further result is that the integrator 98 output which shows the average value for each signal may be of the wrong polarity and constitutes an error. Whichever the polarity, the final integrated value will be undersized. This condition is a "Fade," strictly defined. It is associated with undersized integrator outputs, and also with a high probability of error in the polarity decisions. For the purposes of the present invention, however, any distortion can be called a "Fade" in a looser sense if it is of extended duration compared with a bit time and leads to a substantially increased probability of error. In such an uncertain condition the bits can be considered to be affected by an error burst and can be judged erased.

The condition in which the received bit is of adequate strength but the random noise background is increased (as by arc inteference) may also be represented by FIGURE 9h. In this case the output from the discriminator 96 is lowered by a failure of FM Capture, FM Capture being that characteristic of discriminators which allows them to ignore completely the presence of the weaker of two signals present together. The frequency-selective filter 94 forces the noise to look like a noisy signal centered about the neutral point in the filter band. Such FM Capture effect is particularly weak in systems designed for the desired close packing of subchannels, so that even though the true signal or bit may be stronger than the noise "signal" the true signal does not decisively control the output but is forced into a comprise toward the neutral point. The result is again a high probability of error out of the integrator 98 accompanied by an undersized integrator output, making an erasure judgment proper.

As another example of erasure, high energy interfering electrical impulses may be picked up locally at the output wiring of the discriminator 96, and temporarily yield "signal" outputs which (though tending toward the neutral on the average) will cause many polarity decisions to be both erroneous and larger than those represented by a normal signal. In this case, therefore, a high probability of error occurs for a period of time associated with *oversize* polarity decisions.

As still another example of erasure, FIGURE 9i shows a discriminator output being temporarily shifted from its neutral point. This effect may be due to Doppler shift in the ionosphere as the path length is being lengthened or shortened to a new value; or may be part of such shift not immediately compensated by a receiver which has an automatic frequency control; or may represent a spurious disturbance by the automatic frequency control as it tries to adjust a noisy signal. This wave shows a high probability of error associated with both oversize and undersize decisions. Looking for either size would reveal this condition if the indication is taken over a number of intervals.

All these conditions justifying erasure judgments are detectible by examining the integration of the output of the discriminator 96 for non-standard polarity decision sizes.

Referring to FIG. 10a, to define at once the two polarities as well as the meaning of undersize and oversize, the range of possible outputs from the integrator 98 (at decision time just preceding transition time) is divided into five regions: too negative (oversize "0"), good negative (acceptable "0"), too neutral (undersize "0" or "1"), good positive (acceptable "1"), and too positive (oversize "1"). The boundaries between the regions are labeled I, II, III and IV for convenience in the later discussion.

The integrator 98 as implemented in the preferred embodiment is adapted to operate on the basis of a set of six binary digits. These form a sequential set from 000000 to 111111, in the usual binary counting order. Their numerical significance is not however the usual zero through sixty-three, for they represent a range from full negative to full positive, with zero in the middle represented by 100000. This system avoids treating positive and negative numbers differently, for they form one continuous counting sweep.

Because of space considerations, FIGURE 10b shows a simplified (5 bit, 32 step) version of the digitalized integrator 98 output; a five bit number is made available at decision time as the outputs of five flip-flops. Note in FIGURE 10b that the left hand digit shows directly the polarity of the integrator 98 output. The actual six-bit, 64-step range used in the preferred embodiment may readily be visualized from the 5-bit version of FIGURE 10b.

The digital integrator 98 itself is fundamentally a counter whose operation is illustrated diagrammatically in FIG. 11, showing keyed integration of several arbitrary signal wave forms, FIG. 11a. Negative polarity areas are shown shaded. Using the maximum negative polarity value as base, the integrator 98 starts at zero, FIG. 11b, builds up with an average slope proportional to the real value of the instantaneous discriminator 96 voltage, and at the end of the signal time the integrator 98 output shows the net area under the curve, using as a base the maximum negative polarity value, rather than the conventional midpoint.

In the present preferred embodiment, the neutral point for the full signal time comprises half the full count: 100000, in binary form. A signal at full negative input for the entire signal time will report out 000000; full positive for the entire signal time will report out the full value 111111; other conditions in between. This process leads to a six-bit equivalent of the output table shown in FIGURE 10b.

The digital integrator 98 in the preferred embodiment is implemented for the six-bit numbering scheme by the use of a counter which can accept up to 63 impulses during a signal time. Referring to FIG. 12a the signal wave form is considered to be divided up on the time-voltage plane into 64 blocks, with eight time increments (during any one of which the signal voltage cannot change too badly owing to the rounding off by the FSK filter 94), and eight increments of voltage.

Referring to FIG. 12b, within each time increment column a reference source for each of eight incrementally increased voltage values is consulted to see which of these voltage sources are less than the instantaneous value of the signal voltage. This is accomplished by subdividing each time column into eight narrower time columns during each of which a reference voltage is consulted from one of the eight voltage references in turn, in order of positive increase. This forms an eight step staircase reference. Referring to FIGURE 12c the integrator timing pulses derived from tap 101 (see FIG. 14) are counted up to 64, starting with the beginning of a signal, e.g. time A, by six binary counter stages 1–6 EECO flip-flops T–101. These may be regarded as two sets 105, 107 of three stages each. The first set 105 counts eight steps of the staircase; the second set 107 counts eight staircases before emitting a signal indicating transition from one baud to the next, as the last stage makes its transition back to zero. The staircase voltage is obtained by feeding currents from the stages of the first set 105 to a common junction point 95 through resistors $R_1$, $R_2$, and $R_3$. These are proportioned to yield a relative current change as each stage switches on which is twice as great for the second stage of the set of three as for the first, and 4 times as great for the third. The currents are thus proportioned to the numerical value of the respective counter stages and the total current change into the junction 95 is proportioned to the value of the count in the set, from zero to seven. This process is well-known in the art under the name of "digital-to-analog converter." The voltage change at 95 is formed by this current change acting on the joint impedance of the resistor network. The function of $R_4$ and its 12-volt source is to maintain the absolute level of the staircase voltage in a balanced range about zero voltage similar to the range of the signal to be integrated; otherwise the staircase would run from the lowest to the highest output levels of the individual counter stages, in this case from −11 volts to −3 volts. The inverters 93 EECO T–136 provide voltage standardization to insure equal voltage inputs to the network for greater precision of the staircase.

The staircase voltage at 95 is compared with the input voltage in the Comparator 102, EECO T–172, and whenever the input voltage from discriminator 96 is greater than the staircase a timing pulse is passed by the Pulse-And Gate 99, EECO T–448, whence it is counted by the integrator counter 104. This eight step process is repeated for each of the eight time columns.

As shown in FIGURE 12d, this process has subdivided the area of the time voltage plane into 64 regions covered by 64 reference voltage steps and counted the steps below the actual signal curve, as indicated by small circles on the steps. This count, from zero to 63, is a digitalized integration of the area under the curve. The binary count 000000 shows that the signal never exceeded the most negative reference step, and presumably remained at negative saturation for the entire signal. The count 100000 or 011111 shows about half the reference voltage steps were exceeded, representing a signal that stayed at neutral or averaged about it. Accordingly, FIG. 12d is simply a digitalization of analog integrations such as shown in FIG. 11. A six-place extension of the table in FIGURE 10b is thus applicable to interpreting the readings from the integrator 98 counter 104. The counter 104 is zeroed at every transition time A by resetting the six counter stages from time $A+76$ to time $A+98$.

Referring to FIG. 13 the integrator 98 is diagrammatically illustrated.

The analog voltage from discriminator 96 is applied to integrator 98 along line 100, serving as an input to comparator 102. Also applied to comparator 102 is the reference staircase voltage, as diagrammatically indicated, from reference voltage source 164, the two inputs being synchronized by the clock counter shown in FIG. 14.

The output 103 of comparator 102 is sampled in synchronization with each step of the reference voltage, and is applied to counter 104 comprising a chain of 6 flip-flops (EECO T-101) 106, 108, 110, 112, 114, and 24 in which is stored, at the end of each signal time, the integrator count which can be analyzed to determine whether or not an erasure exists, the analysis being conducted by determining where the count falls relative to the adjustable boundaries of FIGS. 10a and 10b.

For adjustment purposes it is desirable to present to the operator a progressive view of how the integrator 98 is accumulating during the signal. This is difficult to do by watching the digits directly. An output suitable for viewing on an oscilloscope can therefore be made up by placing a high-impedance resistance network 109 on the outputs of the integrator flip-flops to form a crude digital to analog converter. The high impedance does not load or upset the flip-flops; it does not drag down the digital voltages and interfere with the counter accuracy; but yet it is adequate to run an oscilloscope for viewing. The resultant voltage, proportional to the instantaneous digital count in the integrator, closely resembles the integrator output relationships shown in FIGURE 11.

The voltage reference steps are produced by the reference voltage source 164 at intervals of about 210 microseconds. They are not quite evenly spaced because of the arithmetical problems of counting down a 10 microsecond clock to a 13,900 microsecond signal with 64 subdivisions. In operation the first bit along line 103 produced by the comparator 102 is suppressed by gate 113, EECO T-448 by inhibit signal 111 from the clock counter of FIG. 14, whether or not it should have been counted. If it were not, the count might have stood at a full 111111 (63) on the 63rd pulse and be tumbled back to zero if the next one should be counted. This would indicate a very small rather than very large integration.

At the end of the signal time A to A2, the last stage of the integrator counter 104 holds the polarity decision for the signal; since there are two streams of bits to be received and judged, I and P, two independent integrators 98 and 98′ are employed (FIG. 9) one for each channel. In the present example of integrator 98, for the I stream, the final stage of the counter 104 holding the I polarity at the end of one signal and the beginning of the next is the I flip-flop 24 referred to in connection with FIG. 7. As related there, the I flip-flop 24 is read out into the decoder proper at time $A+29$ microseconds and the P flip-flop 26 at time $A+76$. The entire I and P integrator counters are then zeroed by resetting the stages by clamping their Reset inputs to ground from $A+76$ to $A+96$ microseconds. Then the counter 104 is ready to accept the first effective pulse (if it is to be counted) at the next counter time, about 210 microseconds after time A.

The Erasure Indication $f$ could be obtained after the transition time A and before the zeroing time by examining the value of the stored 6-bit numbers to see which of the five regions of FIGURE 10a they fall into. However, regional spreads are inconvenient to examine digitally. This inconvenience is avoided in this preferred embodiment of FIG. 13 by the unique method of following the history of the integration count and counting how many of the four boundaries of FIG. 10a are passed, beginning always at the extreme negative. Passing a boundary corresponds to coincidence of the counter 104 reading with a preset boundary value, bit for bit, a condition that is easily implemented. Examination of FIGURE 10a will show that since at any boundary the indication changes from Erasure to NO Erasure or back, we need only know if we have passed through an odd or even number of boundaries since the start of integration. The boundary counter 27 is thus a single flip-flop, EECO T-101, for the integrator 98. The boundary coincidence lines 118, 120, 122 and 124 are queried every time a pulse is accepted by the comparator 102 and sent to be counted by the counter 104, for these are the times that the count value changes. At these times a pulse is also sent to a boundary gate 126 which is controlled by the boundary coincidence circuits. The significance of this pulse is thus, "Did the count in the counter 104 that is about to be changed correspond with one of the preset boundary values?" (Since the query refers to the PAST step, the 64th pulse is not suppressed for this purpose.) If the pulse is passed by gate 126, the answer is, "Yes." Passed pulses are then sent to the odd-even boundary counter, flip-flop 27.

This boundary flip-flop 27 is set into a "1" state just after the beginning of the signal (at $A+76$). It then signifies that it is temporarily indicating "Erasure" since all signals begin their integration in the oversize negative region. If during the integration it passes Boundary I, it is flipped; it then is signalling "No Erasure" since it is passing through the acceptable negative region. Passing the Boundary II thereafter (if it does so), it is flipped again showing the signal has integrated into the undersize erased region. Thereafter if it passes Boundary III it flips back for the acceptable positive region. If the integrator counts on past Boundary IV, the Erasure flip-flop 27 flips again back to "Erasure," for an oversize positive signal. As noted above, if any of these coincidences occurred on the last effective step, the 63rd, it would have to be questioned at the next step, since the query concerns the count the integrator is now leaving for a new region. For this reason the input comparator 102 (which compares signal voltage with the step reference) is queried on all 64 pulses as to whether a count is about to be entered, i.e. whether the signal voltage is greater than the reference step voltage; the 64th or 0th is suppressed for the integrator counter 104 but used for the Erasure counter flip-flop 27.

For some transmission media it may be desirable to have all four boundaries individually adjustable, and indeed where no local interference is encountered it may be possible to dispense with the outer boundaries and commence counting with flip-flop 27 set at "no erasure." But in the present preferred embodiment outside boundaries I and IV are linked to a single control switch 136 to move outward or inward relative to neutral together and the Inner boundaries II and III are similarly linked to another control switch 137, to move similarly together.

Coincidence with Upper boundaries, III and IV, is found by six-input AND gates, 128 and 130 respectively, EECO T-650. For example, let us say that Boundary IV is to be set at 110111 (110000 being the nominal "1" polarity). The assertion outputs of the first, second, fourth, fifth and sixth stages and the negation side of the third stage of the integrator counter 104 are brought to the six inputs of the AND gate 130 through control switch 136. The values of this example are shown in FIG. 13. The gate output eventually goes to the PULSE-AND gate 126 which is queried by the next counter input, etc., as detailed above.

If the Upper Boundary IV is set at 110111, the Lower Outside Boundary I is symmetrically 001000. To examine for this condition, the same six outputs are led through control 136 to the inputs of a six input NOR gate 132, EECO T-645. This reads "0" only for the condition 001000. An inverter 133, EECO T-136, after the NOR then reads "1" for this condition, and its output goes eventually to the PULSE-AND gate 126 which is queried for crossing the Lower Outside Boundary I.

Since the Upper Outside boundary IV always begins with 11 . . ., these outputs from the assertion side of the counter 104 can be permanently wired to the six-in-put gates 130 and 132. The other four inputs are fed through control switch 136, e.g. through four wafers of a conventional 16-position switch. The wafers are wired to assertion and negation sides of the stages 106, 108, 110 and 112, so that each of the sixteen possible choices for the boundary appear in binary numerical order if the switch is rotated.

In the preferred embodiment the I and P channels are similar and are treated identically so another four wafers on the same switch 136 can pick the definition of Outside boundaries for P channel integrator 98'.

An analogous situation holds for the two Inside boundaries II and III. The Upper Inside Boundary III always begins with 10 . . ., which is permanently wired to those two corresponding sides, with the last four bits fed through four switch wafers of control switch 137 and the lower boundary is fed into NOR gate 134 and inverter 135. The corresponding P boundaries are fed from four other wafers on the same switch shaft from the P counter stages.

The four boundary coincidence lines 118, 120, 122 and 124 in the I channel are fed to an OR gate 138, EECO T–651, whose output is an indication of a coincidence with any boundary. The OR gate 138 feeds the PULSE-AND gate 126 control input; the pulse input of this gate is fed with the counted pulse from line 103. A pulse passed through the PULSE-AND gate 126 to flip-flop 27 then signifies that the count is leaving a boundary value and the number of boundary crossings is counted in flip-flop 27 as discussed above. The flip-flop 27 is queried by the gate 30 shown in FIG. 6 after the completion of the signal to see if there is a final determination of Erasure, and the P channel has an identical arrangement and its output is combined with that of the I channel so that Erasure is indicated if either I or P indicates it, as described in connection with FIG. 6.

The timing of the transition times and of the 64 integrator pulses for each bit is accomplished in an 11-stage counter shown in FIG. 14 which counts inputs from an external 100 kc./s. precision clock whose frequency closely matches that of a similar clock at the transmitter site for keying the encoder. The signal time is 13,900 microseconds; as obtained from the 10-microsecond clock inputs, this requires a count of 1390. Eleven flip-flops 140, EECO T–101, normally produces a count of 2048. By means of appropriate circuitry various clumps of counts are artificially supplanted when certain stage transitions occur ("Digital Feedback"), in a manner that is known. Thus the feedback from stage 4 to stage 10 supplants 16 by supplanting two pulses (the normal number to flip stage 10) on each of the eight occasions that stage 4 goes to a 1 state during the signal. The gate 142 in this path from 4 to 10 is used just for ease of combining with the other path to stage 10. This other path through 144 is the logical equivalent to a simple path from stage 1 to stage 10 (supplants 2 counts once), but has a shorter delay and allows stage 10 to be ready for the next real count. All PULSE-AND gates 142 are EECO T–448; AND gate 144, T–650; emitter followers 117 are EECO T–111; emitter followers 119 are EECO T–111 and T–114 in parallel; and NOR gate 115 is EECO T–645.

Feedback from stage 8 to stage 11 (returning 11 back to 1 state when 8 goes from 0 to 1 state) has the effect of supplanting one input count on each of the 128 occasions that stage 8 does this during the baud; it is worth 128 of the total count. Stage 8 to stage 9 supplants 4 counts on each of these occasions; its value in the total is 512. The total supplanted count is 512+128+16+2, or 658. This subtracted from the basic 2048 of an 11 stage counter leaves a count cycle of the desired 1390.

The timing on line 101 for the integrator counter is taken from the transition to 0 state of stage 7. This is the Time A, when it occurs at the beginning of a signal, and in general occurs 64 times during the signal. It is followed in the chain by 6 stages which may be considered a subordinate count of 64. These six stages are those referred to on FIG. 12c which generate the eight staircases of eight steps each in each baud. The staircase voltage is derived from the stages labeled 4, 5, and 6 in FIGURE 14. The counts on line 101 are not quite even, for feedbacks derived from stages after stage 7 cause nine of the subordinate periods to be missing 2 clock inputs or 20 microseconds, a minor deviation. The normal subperiod is 220 microseconds.

The count can be varied by the Manual Sync Switch 121 shown in FIG. 14 to shorten or lengthen the timing and is used to adjust the phase of the integration and decisions with respect to the incoming signal. The operator can judge this by looking at an oscilloscope presentation of the incoming analog signals from the discriminator 96, with the oscilloscope sweep synchronized to the A+2 time. Any signal transitions should tend to cross-over at A+2 time transition, even with a noisy and varying channel. By manipulating the switch 121 the operator can chase the true timing phase from either side. As shown, in normal position, the count is 1390. With the switch in fast position the —2 contribution occurs twice as often and the count is speeded up to 1388. With switch at the down position the —2 contribution is inhibited and the count is slowed to 1392.

It will be appreciated that the digital integrator 98, including its comparator 102 and its counter 104, comprises polarity decision means, while these components and the various gates 128, 130, 132, 134 and 138 comprise erasure detection means.

Referring to FIG. 19 there is shown the combination of a modular encoder and a synchronizer for coordinating the encoder with a high fraquency radio transmission system.

A source 202 of digital data applies a stream of data along line 204 to the encoder 206, where it enters the information register of the encoder and along line 208 for direct transmission, in the conventional manner. A modulo 2 adder 210 adds the data from the code taps $g$ to form parity bits $p$ which pass to line 212 for transmission.

The channel with which this system is adapted for use has an error repeat length of L, as defined by the number of tones into which the stream is broken for transmission.

According to the modular principle of construction the code taps are spaced apart by multiples of the error repeat length L; in this particular embodiment each tapped position is shown as a single memory stage 214, and between each pair of such stages is a delay line 216, 218, 220 of length L—1, 2L—1, and 4L—1, respectively. Thus the spacing of adjacent taps is adapted to accommodate a burst of length up to L, according to the diffuse principle.

The $i$ and $p$ streams are passed to a distributor 220 which is synchronized with the data stream by synchronizer 218. The distributor acts to break down the $i$ and $p$ streams into separate streams for the modem, making $i_1 p_1$ available for the first stream, $i_2 p_2$ for the second stream, $i_L p_L$ for the Lth stream and $i_{L+1} p_{L+1}$ for the first stream. The synchronizer ensures that the $i$'s and $p$'s of the same subscript are available for a single stream.

From the distributor the streams pass to the modulator 222 which produces a series of tones each carrying the appropriate $i$ and $p$ pairs, thence to an audio multiplexer 224 where the tones are readied for transmission by transmitter 226 in a conventional manner.

Referring to FIG. 20, there is shown a specific synchronizer and distributor apparatus for use in the embodiment of FIG. 19. In this instance the encoder is adapted for use with the Data Modem TE 216A–4D manufactured by the Collins Radio Company, Newport Beach, Calif. The equipment shown within dotted lines is part of that modem, and comprises four tone generators 230 and for each tone a pair of phase shift key units 232, 234, for low order and high order shifts respectively.

The low order shift unit is controlled by $i$ line 236 and the high order shift unit by $p$ line 238.

The output of these keyed tones is applied to the audio multiplexer 224, as described above.

The synchronization and distributing functions in this embodiment are performed by a modulo 4 counter 240 having outputs for 1, $\bar{1}$ (not one), 2 and $\bar{2}$, along with a series of Nand gate pairs 242, 244.

The pairs of Nand gates for the $i$'s and $p$'s of the same subscript are actuated by the same count of the counter, while a different actuating count is required for each tone as shown. Thus, at time 1, when $i_1$ has caused counter 240 to assume state 1 $\bar{2}$, the second tone is rendered receptive and $i_1$ is applied to key unit 232 and $p_1$ to key unit 234, and so on.

The counter stages 250 can be formed with gated flip-flop packs such as modules FA-20 manufactured by Computer Control Company of Framingham, Mass., series 200 KC S-Pac, while the Nand gates can comprise gate pack modules DN-20, of the same series. The wiring shown is in accordance with the manufacturer's nomenclature.

Needless to say the system can be proliferated for use with a larger number of tones, as is often desired.

Referring to FIG. 21, a receiver and decoder system is shown. In accordance with conventional techniques, after high frequency transmission and exposure to error conditions, in many cases to gradual spectrum fades, the transmission is received and passed to the decoder, with proper synchronization. For operation with the encoder of FIG. 19, X, $X_1$ and $X_2$ can be taken as 1, 2 and 4 respectively, and the high frequency system can achieve the very desirable features mentioned above, with regard to shortening the effect of the error burst.

On the other hand, the system of FIG. 21 might be employed with wholly separate circuits, e.g. $i_1$ $p_1$ and $i_{L+1}$ $p_{L+1}$ might be adjacent signals received over a telephone wire and $i_2$, $p_2$ and $i_{L+2}$ $P_{L+2}$ might be adjacent signals received by radio, and the two might have originated in synchronization from different places. If such is the case, X, $X_1$ and $X_2$ might all be taken as equal to small numbers, especially where error bursts are not encountered, so that the decoder takes advantage only of the modular principle of the invention.

Referring to FIG. 22 the receiver of FIG. 21 is shown in an embodiment adapted for use with the encoding-transmitting equipment of FIG. 20, the demodulating apparatus being part of the same Collins unit described above, and the gated packs being the same kind as in FIG. 20, wired to deliver out $i$ and $p$ streams to the decoder.

Numerous modifications of the specific details of the various embodiments will occur to those familiar with communication and logic devices.

What is claimed is:

1. An error correcting binary digital coding system of the convolutional type, including an encoder and a decoder, said encoder having an encoder memory through which a stream of information bits can pass, said encoder having circuitry for generating a stream of redundancy bits by forming modulo 2 sums of selected groups of information bits, said groups of information bits obtained sequentially from a set of tapped positions in said memory that are connected to establish a convolutional coding rule, whereby each information bit appears in a plurality of said redundancy bits, said decoder constructed to receive said information and redundancy bits after exposure to error conditions, said decoder having a decoder memory through which said received information bits can pass, said decoder memory having a predetermined set of tapped positions corresponding to said positions in said encoder memory, parity means constructed to add modulo 2 each received redundancy bit with the corresponding group of received information bits appearing in said tapped positions in said decoder memory, and decoding decision means constructed, for each received information bit, to consider selected signals from the output of said parity means, and correct errors in said received information bit, said coding system constructed for use where the conditions of transmission produce extended bursts of errors in the transmitted bits from time to time, said extended bursts having a predetermined maximum probable length, wherein the improvement comprises there being at least three taps in each of said set of taps thereby to provide at least three redundancy bits checking each information bit to be decoded, at least two adjacent positions of said set of tapped positions in said encoder and decoder memories being separated by an extended section of storage means of predetermined length greater than said maximum probable length, said encoder having connections causing some but not all of the bits of the set comprising a given information bit, the redundancy bits checking that bit, and the other information bit constituents of those redundancy bits to be transmitted spaced at least said maximum probable length apart and the others of said set to be spaced less than said maximum probable length apart whereby they may be affected by the same error burst, said decoder responsive to each information bit and to the respective redundancy bits checking it and capable of making correct decoding decisions even when an error burst affects at least two of said others of said set, said decoder including guard means constructed to guard the decoder output against the effects of a said error burst when said error burst is located at least partially in said decoder memory, but at least partially outside of said extended section of storage means.

2. The system of claim 1 wherein said others of said set comprise said given information bit and one of said redundancy bits checking said given information bit.

3. The system of claim 1 wherein said others of said set comprise two information bit constituents of said redundancy bits.

4. The coding system of claim 1 in combination with means producing said information bit stream at the encoder in strict synchronization with a real time clock, said extended sections of storage means comprising extended, untapped lengths of time delay line means.

5. The system of claim 1 for use with a channel having a predetermined error repeat length of L bits wherein each pair of adjacent positions of said set of tapped positions in said encoder memory, and the corresponding positions in said decoder memory is spaced an integral multiple of integer L, whereby said system is constructed to operate on a modular basis with respect to said stream of information bits.

6. The system of claim 1 wherein said decoding decision means is constructed and arranged, for each information bit, to form from the output of said parity means a set of at least three subsolution signals orthogonal upon said information bit, and said decoding decision means including means to consider said set and, responsive to said consideration, to change the value of said information bit.

7. The system of claim 6 wherein said decoding decision means is constructed to correct random errors by threshold logic, said set comprising at least four orthogonal subsolution signals for each information bit, and said decision means constructed, at least so long as there is no indication of the presence of an error burst, for each information bit to generate a binary solution signal whose value depends upon whether an ordinary arithmetic sum controlled by the values of the corresponding set of subsolution signals exceeds a predetermined threshold value.

8. The system of claim 1 wherein said guard means includes at least a second extended section of storage means in said decoder memory separating a pair of tapped positions at least one of which positions is different from said adjacent pair, said second extended section also having a length greater than said maximum length.

9. The system of claim 8 wherein at least a majority of said tapped positions in said decoder memory are spaced from one another a distance greater than said maximum probable length.

10. The system of claim 9 wherein all tapped positions in said memory are spaced from their adjacent positions each by an extended section of storage means having a length greater than said maximum probable length and wherein said decoding decision means is constructed and arranged, for each information bit, to form from the output of said parity means a set of at least three subsolution signals orthogonal upon said information bit, and said decoding decision means including means to consider said set and responsive to said consideration, to change the value of said information bit.

11. The system of claim 9 wherein said extended lengths of said sections of storage means are unequal in length.

12. The decoder of claim 11 adapted for operation at code rate ½, so that one redundancy bit is formed for every information bit, wherein said extended section of storage means located between the first and second of said tapped positions in said memory, numbering from one side of said decoder memory, has a given initial length, the extended section between the second and third positions has length at least greater than said initial length and the extended section between the third and fourth positions has length at least greater than twice said initial length.

13. A decoder for use with a corresponding encoder according to a convolutional code said encoder having an encoder memory through which a stream of information bits can pass, said encoder having circuitry for generating a stream of redundancy bits by forming modulo 2 sums of selected groups of information bits, said groups of information bits obtained sequentially from a set of tapped positions in said memory that are connected to establish a convolutional coding rule, whereby each information bit appears in a plurality of said redundancy bits, said decoder constructed to receive said information and redundancy bits after exposure to error conditions, said decoder having a decoder memory through which said received information bits can pass, said decoder memory having a predetermined set of tapped positions corresponding to said positions in said encoder memory, parity means constructed to add modulo 2 each received redundancy bit with the corresponding group of received information bits appearing in said tapped positions in said decoder memory, and decoding decision means constructed, for each received information bit, to consider selected signals from the output of said parity means, and correct errors in said received information bit, said decoder constructed for use where the conditions of transmission produce extended bursts of errors in the transmitted bits from time to time, said extended bursts having a predetermined maximum probable length, wherein the improvement comprises there being at least three taps in each of said set of taps thereby to provide a set of at least three redundancy bits checking each information bit to be decoded, at least two but not all adjacent positions of said set of tapped positions in said decoder memory are separated by an extended section of storage means of predetermined length greater than said maximum length, there being at least two adjacent positions of said set of taps closer together than said length whereby two information bits which are constituents in the set of redundancy bits checking any information bit may be affected by the same error burst, said decoder responsive to each information bit and the respective set of redundancy bits and constructed to make decisions when an error burst affects said two information bits, said decoder including guard means constructed to guard the decoder output against the effects of a said error burst when said error burst is located at least partially in said decoder memory, but at least partially outside of said extended section of storage means.

14. The decoder of claim 13 wherein said guard means includes a monitor means constructed to monitor the bits being received and generate an erasure indication when a monitored bit demonstrates a substantial probability of error, and control means in said decision means responsive to said erasure indication for controlling the consideration of signals from the output of said parity means.

15. The decoder of claim 14 wherein said decision means is adapted, for each information bit, to form a set of at least three subsolution signals that are orthogonal upon said information bit, said decision means constructed to form at least one of said subsolution signals from an output of said parity means when said information bit resides in a tapped position located at one side of said extended section of storage means in said decoder memory, and constructed to form at least one of said subsolution signals from an output of said parity means when said information bit resides in a tapped position located at the opposite side of said extended section of storage means, the decoding solution of said decoding decision means connected to be influenced by both of said subsolution signals in the absence of an erasure indication, for the correction of random errors, and said control means, upon the occurrence of an erasure indication for one of the bits forming one of said subsolution signals, constructed to suppress said subsolution signal from influencing the decoding solution.

16. The decoder of claim 15 wherein said decoding decision means is constructed to correct random errors by threshold logic, said set comprising at least four orthogonal subsolution signals for each information bit and said decision means constructed, for each information bit to generate a binary solution signal whose value depends upon whether an ordinary arithmetic sum controlled by the values of the corresponding set of subsolution signals exceeds a predetermined threshold value, said control means connected to respond to said indication of erasure of a received bit and suppress all subsolution signals containing received bits within the distance of said maximum length from said received bit to prevent them from affecting the solution of said decision means, and to alter the logic of said decision means to cause only the remainder of said set of subsolution signals to influence the decoding solution.

17. The decoder of claim 16 wherein a single extended section of storage means is provided in said decoder memory, said control means constructed to suppress all subsolution signals containing received bits positioned on the side of said section of storage means to which said erasure indication relates.

18. The decoder of claim 14 wherein said monitor means is connected to monitor received information bits, an erasure memory constructed to store said erasure indications in binary digital form, and an extended section of storage means in said erasure memory corresponding in location to said extended storage means in said decoder memory, said control means constructed to respond to erasure bits lying outside of their extended storage means, corresponding with information bits lying outside their extended storage means.

19. The decoder of claim 14 wherein said monitor means is connected to monitor both the information and redundancy bits arriving at the decoder.

20. The decoder of claim 13 in combination with means constructed to transmit said information and redundancy bits in separate streams.

21. The decoder of claim 13 for use with a channel having a predetermined error repeat length of L bits wherein each pair of adjacent positions of said set of tapped positions in said decoder memory is spaced an integral multiple of integer L, whereby said decoder is constructed to operate on a modular basis with respect to said stream of information bits.

22. A decoder for use with a corresponding encoder according to a convolutional code, said encoder having an encoder memory through which a stream of information bits can pass, said encoder having circuitry for generating a stream of redundancy bits by forming modulo 2 sums of selected groups of information bits, said groups of information bits obtained sequentially from a set of tapped positions in said memory that are connected to establish a convolutional coding rule, whereby each information bit appears in a plurality of said redundancy bits, said decoder constructed to receive said information and redundancy bits after exposure to error conditions, said decoder having a decoder memory through which said received information bits can pass, said decoder memory having a predetermined set of tapped positions corresponding to said positions in said encoder memory, parity means constructed to add modulo 2 each received redundancy bit with the corresponding group of received information bits appearing in said tapped positions in said decoder memory, and decoding decision means constructed, for each received information bit, to consider selected signals from the output of said parity means, and correct errors in said received information bit, said coding system constructed for use where the conditions of transmission produce extended bursts of errors in the transmitted bits from time to time, said extended bursts having a predetermined maximum probable length, wherein the improvement comprises there being at least three taps in each said set of taps thereby to provide at least three redundancy bits checking each information bit to be decoded, at least two adjacent positions of said set of tapped positions in said encoder and decoder memories being separated by an extended section of storage means of predetermined length greater than said maximum length, means constructed to obtain and store an indication that a received information bit may be in error, said means connected to present said indication to said decoding decision means in substantial synchronization with the emergence of said information bit from said extended section of storage means in said decoder memory, and said decoding decision means constructed to respond to said indication and cause the decoding decision to be controlled by the part of the output of said parity means formed when said received information bit appears at a tapped position in said decoder memory located at the output side of said extended storage means.

23. The decoder of claim 22 having a random error correcting ability wherein said decoding decision means is constructed, when said indication is not being presented thereto, to form a set of at least three subsolutional signals orthogonal upon the information bit being decoded said decision means constructed to form at least one of said subsolution signals from an output of said parity means when said information bit resides in a tapped position located at the input side of said extended section of storage means in said decoder memory, and said decoding decision means constructed to produce a decoding decision dependent on the values of said set of subsolution signals when said indication is not presented.

24. A decoder for use with a corresponding encoder in an error correcting digital convolutional coding system for use with a channel having a predetermined error repeat length of L information digits and a probable error burst length of M, said decoder and said encoder each having a memory through which a stream of information digits passes and a multiplicity of taps connected to digital positions of said memory, said taps connected to means for combining the values of the digits appearing on said taps for use by said coding system in evaluating parity, the spacing between each pair of adjacent taps being an integral multiple of L, whereby parity can be evaluated on a modular basis with respect to said information digits, the spacing between at least one such pair of adjacent taps being greater than M, said decoder including check means for evaluating parity, correction means responsive to said check means for correcting received digits, and guard means capable of guarding said correction means against the effects of an error burst when said error burst is located at least partially in said memory, but at least partially outside of the section of memory lying between said one pair of taps.

25. The decoder of claim 24 wherein said check and correction means comprises means for forming a set of subsolution signals orthogonal upon a given information digit and means to consider said set and, responsive to said consideration, to change the value of said information digit.

26. The decoder of claim 25 wherein said set comprises at least four orthogonal subsolution signals for said digit, and said decoder operates on the basis of threshold logic.

27. The decoder of claim 24 wherein said guard means comprises tracking means adapted to track an error burst moving through said decoder, and to modify said decoder logic dependent upon the position of said error burst.

28. The decoder of claim 24 wherein said guard means comprises delay means between each pair of tapped positions sized longer than M.

29. The decoder of claim 24 for use with a channel having L separate paths for said digits, including mating means for mating the contents of said decoder memory to said L paths to synchronize the modular handling of said data.

30. The decoder of claim 29 wherein said mating means comprises means for collecting data from said paths and combining it into synchronized $i$ and $p$ streams for use by said decoder.

31. For use with a multi-tone transmission system, the combination of an encoder for encoding a serial stream of information digits, connecting means for converting encoded data to a multiplicity L of tones, and decoder means for decoding data from said tones into a serial stream of information digits, said encoder and decoder having corresponding information memories each having a multiplicity of tapped positions to generate parity data upon which said coding system operates, each pair of adjacent taps being spaced an integral multiple of integer L apart, and means synchronizing said encoder, connecting means, and decoder whereby said digits are handled on a modular basis throughout, whereby errors occurring on a given tone are prevented from affecting the decoding of data transmitted on other tones.

32. The system of claim 31 for use with a high frequency channel having a characteristic error burst length M, wherein at least one pair of taps in said encoder memory, and the corresponding taps of said decoder memory are spaced a length greater than M, and guard means adapted to guard the operation of said decoder against the effects of an error burst when it is in said decoder but not entirely residing within said spacing.

References Cited

UNITED STATES PATENTS 2,956,124   10/1960   Hagelbarger _____ 340—146.1 X
3,155,818   11/1964   Goetz _____ 235—153
3,303,333   2/1967   Massey _____ 235—153

MALCOLM A. MORRISON, *Primary Examiner.*

CHARLES E. ATKINSON, *Assistant Examiner.*

U.S. Cl. X.R.

235—153

UNITED STATES PATENT OFFICE
CERTIFICATE OF CORRECTION

Patent No. 3,447,132                                      Dated May 27, 1969

Inventor(s) Arthur Kohlenberg

It is certified that error appears in the above-identified patent and that said Letters Patent are hereby corrected as shown below:

Col. 1, line 61, correct "through" to --though--;

Col. 5, line 3, correct "theese" to --these--;

Col. 7, line 45, correct "gan" to --gain--;

Col. 9, line 36, correct "$1_{o-1}$" to --$1_{n-1}$--;

Col. 9, line 63, correct "$e_1{}^{ixe_y^i}-x+1$" to --$e_1{}^i+e^i{}_y-x+1$--;

Col. 10, line 59, after "$S_{n-j+1}$" insert --,--;

Col. 11, line 46, correct "proable" to --probable--;

Col. 13, line 70, correct "$e_{n-3}{}^1$" to --$e_n{}^1{}_{-3}$--;

Col. 13, line 70, correct "$e_{n-2}{}^1$" to --$e_n{}^1{}_{-2}$--;

Col. 14, line 35, delete "stream";

Col. 15, line 72, after "T-645" insert --is--;

Col. 17, line 2, change "states" to --state--;

Col. 25, line 38, correct "$P_{L+2}$" to --$p_{L+2}$--;

Col. 26, line 8, correct "whertin" to --wherein--.

Signed and sealed this 26th day of September 1972.

(SEAL)
Attest:

EDWARD M. FLETCHER, JR.                    ROBERT GOTTSCHALK
Attesting Officer                          Commissioner of Patents